(12) United States Patent
Weingarten et al.

(10) Patent No.: US 8,572,000 B1
(45) Date of Patent: Oct. 29, 2013

(54) METHOD AND SYSTEM FOR ELECTRONIC MANAGEMENT OF RECRUITING

(71) Applicants: Jason Weingarten, Chicago, IL (US); Daniel Bartfield, Hinsdale, IL (US); Jeffrey Beavers, Chicago, IL (US); Jonathan Ozeran, Chicago, IL (US); Brian Sarsany, Park Ridge, IL (US); Stoian Tiufekchiev, Potomac Falls, VA (US)

(72) Inventors: Jason Weingarten, Chicago, IL (US); Daniel Bartfield, Hinsdale, IL (US); Jeffrey Beavers, Chicago, IL (US); Jonathan Ozeran, Chicago, IL (US); Brian Sarsany, Park Ridge, IL (US); Stoian Tiufekchiev, Potomac Falls, VA (US)

(73) Assignee: Recsolu LLC, Chicago, IL (US)

( * ) Notice: Subject to any disclaimer, the term of this patent is extended or adjusted under 35 U.S.C. 154(b) by 0 days.

(21) Appl. No.: 13/725,746

(22) Filed: Dec. 21, 2012

Related U.S. Application Data

(60) Provisional application No. 61/683,496, filed on Aug. 15, 2012, provisional application No. 61/674,258, filed on Jul. 20, 2012.

(51) Int. Cl.
   *G06Q 10/00* (2012.01)
(52) U.S. Cl.
   USPC .......................................... 705/321; 705/320
(58) Field of Classification Search
   USPC ..................................... 705/1, 319, 320, 321
   See application file for complete search history.

(56) References Cited

U.S. PATENT DOCUMENTS

| | | | |
|---|---|---|---|
| 2002/0128894 A1* | 9/2002 | Farenden | 705/8 |
| 2006/0106636 A1* | 5/2006 | Segal | 705/1 |
| 2006/0235884 A1* | 10/2006 | Pfenninger et al. | 707/104.1 |
| 2008/0027747 A1* | 1/2008 | McGovern et al. | 705/1 |
| 2008/0206725 A1 | 8/2008 | Diaz et al. | |
| 2010/0136956 A1 | 6/2010 | Drachev et al. | |
| 2010/0280904 A1* | 11/2010 | Ahuja | 705/14.58 |
| 2012/0069131 A1* | 3/2012 | Abelow | 348/14.01 |

OTHER PUBLICATIONS

Vizability Inc. "Vizability Goes Mobile with Personal QR Codes". Computer Weekly News (Mar. 31, 2011): 609.*
RECSOLU iPad App Integration presentation, Jun. 2011.

* cited by examiner

*Primary Examiner* — Gabrielle McCormick
(74) *Attorney, Agent, or Firm* — McAndrews, Held & Malloy, Ltd.

(57) ABSTRACT

A terminal may be configured to display a list of recruiting events. In response to selection of one of the recruiting events, the terminal may be configured to display a list of a plurality of candidates associated with the selected one of the recruiting events. The terminal may be configured to select one of said candidates from the list of candidates based on an identifier read, by the terminal, from a computing device associated with the selected candidate. The terminal may be configured to, subsequent to the selection of the candidate, display a profile of the selected candidate. The terminal may be configured to display an interactive form via which a user of the terminal can input an assessment of the selected particular candidate.

20 Claims, 30 Drawing Sheets

| Candidate 2 assessment 2 Detail |||
|---|---|---|
| (assessment Caption) 430 |||
| | Question | Assessment of candidate's response |
| 423₁ | [Question 1] | 4/5 |
| 423₂ | [Question 2] | 3/5 |
| | Question | Candidate's response |
| 425₁ | [Question 3] | [response to question 3] |
| 425₂ | [Question 4] | [response to question 4] |
| | Characteristic | Fit to candidate |
| 427₁ | [Characteristic 1] | 4/5 |
| 427₂ | [Characteristic 2] | 2/5 |
| View notes 429 |||

FIG. 4C

METHOD AND SYSTEM FOR ELECTRONIC MANAGEMENT OF RECRUITING

CLAIM OF PRIORITY

This patent application makes reference to, claims priority to and claims benefit from: U.S. Provisional Patent Application Ser. No. 61/683,496 entitled "Method and System for Electronic Management of Recruiting" and filed on Aug. 15, 2012; and U.S. Provisional Patent Application Ser. No. 61/674,258 entitled "Method and System for Electronic Management of Recruiting" and filed on Jul. 20, 2012.

Each of the above-identified applications is hereby incorporated herein by reference in its entirety.

TECHNICAL FIELD

Aspects of the present application relate to recruiting management. More specifically, to a method and system for electronic management of recruiting.

BACKGROUND

Conventional methods and systems for managing recruiting processes can be inefficient and inconvenient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for electronic management of recruiting, substantially as illustrated by and/or described in connection with at least one of the figures, as set forth more completely in the claims.

BRIEF DESCRIPTION OF THE DRAWINGS

FIG. 4C depicts an example candidate completed assessment form window displayed by an example recruiting terminal.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms and "module" refer to functions than can be performed by one or more circuits. As utilized herein, the terms "e.g.," and "for example" set-off lists of one or more non-limiting examples, instances, or illustrations. As utilized herein, "list" is used generically to describe arrangements of data such as lists, matrices, arrays, tables, etc. As utilized herein, a terminal, device, circuit, etc. is "operable" to perform a function whenever the circuitry comprises the necessary hardware and code (if any is necessary) to perform the function, regardless of whether performance of the function is disabled, or not enabled, by some user-configurable setting.

Figure 1:
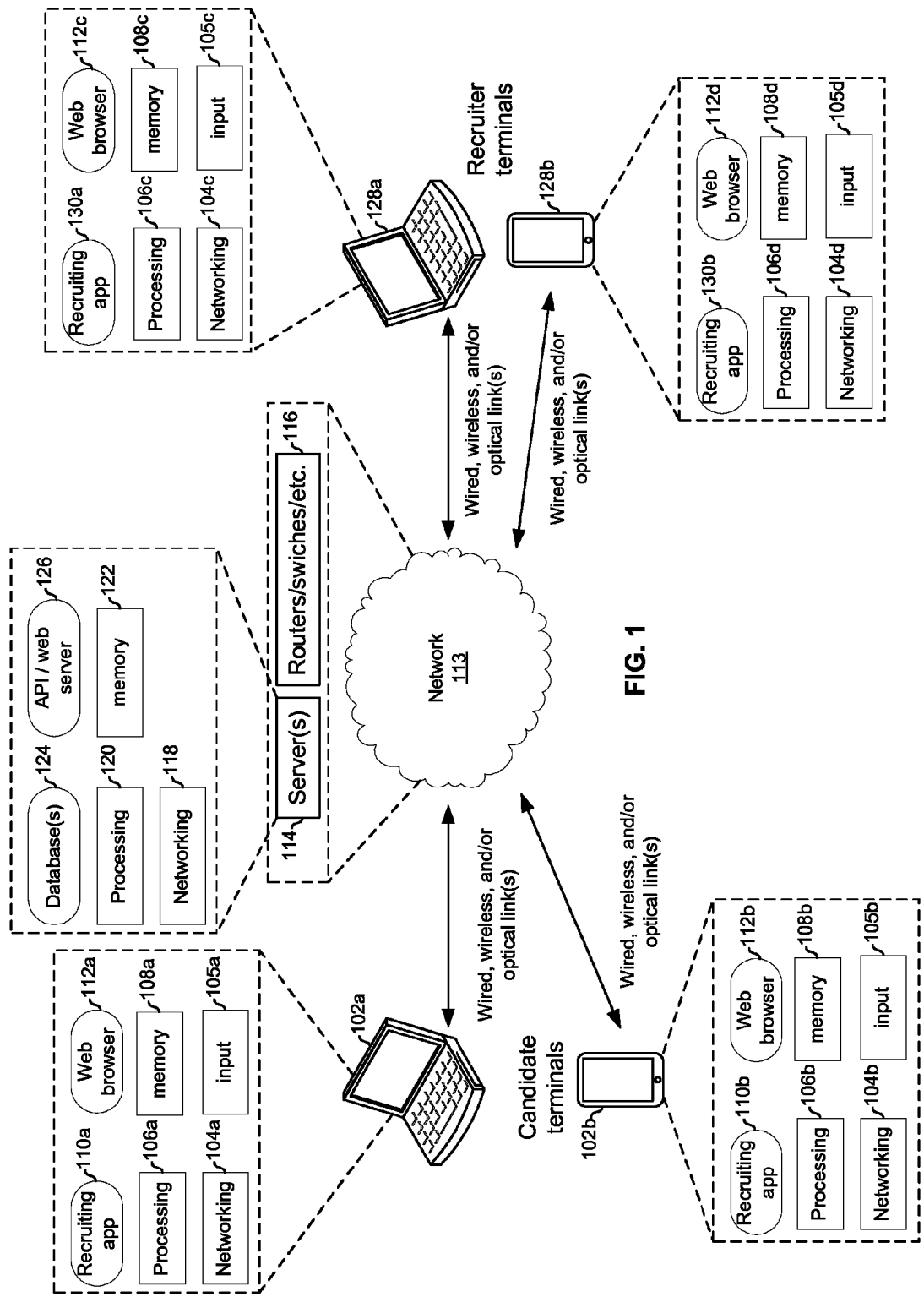
FIG. 1 depicts an example system for implementing electronic recruiting management.

FIG. 1 depicts an example system for implementing electronic recruiting management. Referring to FIG. 1, the system comprises candidate terminals 102a and 102b, recruiter terminals 128a and 128b, and a network 113 to which the candidate terminals 102 and recruiter terminals 128 are connected (and thus a part of).

The network 113 may comprise one or more servers 114 and one or more routers, switches, cables, and/or other network "plumbing." The server(s) 114 may comprise a processing circuit 120, a memory circuit 122, and a networking circuit 118.

The processing circuit 120 may, for example, comprise one or more single or multi-core central processing units (CPUs), application specific integrated circuits (ASICs), and/or a field programmable gate arrays (FPGAs). The processing circuit 120 may be configured to effectuate the operation of the server(s) in which it resides by executing lines of code stored in the corresponding one of the memory circuits 108a-108d. The lines of code may include an operating system and one or more applications. Examples of such applications include the database application 124 and the server application 126. One or more of the processes described below in this disclosure may result from such code being executed by the processing circuit 120.

The database application 124 may comprise code for managing recruiting data stored in memory 122 and for generating a user interface via which the data may be stored to memory 122, retrieved from memory 122, organized, searched, and/or otherwise managed. The user interface may, for example, be served to candidate and/or recruiter terminals via the server application 126. For example, database queries generated by the recruiting app 110, the browser 112, and/or the recruiting application 130 may be relayed to the database application 124 via the server application 126 and the results of the queries may be returned to the app 110, the application 130, or the browser 112 via the server application 126.

The server application 126 may comprise code for performing the functions of a web and/or application server. In this regard, the server(s) 114 running the server application 126 may provide services and/or content to networked client devices, such as terminals 102a, 102b, 128a, and 128b, via the use of one or more protocols (e.g., HTTP) and/or application programming interfaces (APIs).

The memory circuit 122 may, for example, comprise non-volatile memory, volatile memory, read only memory (ROM), random access memory (RAM), flash memory, magnetic storage, and/or any other suitable memory. The memory circuit 122 may comprise program memory, run-time memory, and mass storage. Program memory may store lines of code executable by the processing circuit 120 to effectuate operation of the operating system and one or more applications. Runtime memory may store data generated and/or used during execution of the OS and/or applications. Mass storage may store any number and/or types of data including candidate profile data, organization profile data, documents, forms, and/or any other type of data generated and/or used during recruiting processes. Data stored in mass storage may be managed via the database application 124.

The networking circuit 118 may comprise, for example one or more network interface cards (NICs) and may be configured to communicate over one or more network links in accordance with one or more network protocols such as, for example, Wi-Fi, LTE, wired Ethernet, DOCSIS, DSL, Fiber Channel Protocol, and/or any other suitable protocol.

Each of the candidate terminals 102a and 102b, and each of the recruiter terminals 128a and 128b, comprises a respective one of processing circuits 106a-106d, a respective one of networking circuits 104a-104d, a respective one of user input devices 105a-105d, and a respective one of memory circuits 108a-108d. Each of the terminals 102a, 102b, 128a, and 128b may be, for example, a portable terminal such as a desktop PC or a mobile terminal such as a smartphone, a tablet computer, a notebook computer, or any other suitable computing device.)

Each of the processing circuits 106a-106d may, for example, comprise a single or multi-core central processing unit (CPU), an application specific integrated circuit (ASIC), and/or a field programmable gate array (FPGA). Each of the processing circuits 106a-106d may be configured to effectuate operation of the terminal in which it resides by executing lines of code stored in the corresponding one of the memory circuits 108a-108d. The lines of code may include an operating system and one or more applications. Examples of such applications include the recruiting applications 110a and 110b, recruiting applications 130a and 130b, and the web browser applications 112a-112d. Processes described below in the remainder of this disclosure may be the result of such code being executed by one or more processing circuits 106a-106d.

Each of the memory circuits 108a-108d may, for example, comprise non-volatile memory, volatile memory, read only memory (ROM), random access memory (RAM), flash memory, magnetic storage, and/or any other suitable memory. Each of the memory circuits 108a-108d may comprise program memory, run-time memory, and mass storage. Program memory may store lines of code executable by the processing circuits 106a-106d to effectuate operation of the operating system and one or more applications. Runtime memory may store data generated and/or used during execution of the OS and/or applications. Mass storage may store any number and/or types of data including candidate profile data, organization profile data, documents, forms, and/or any other type of data generated and/or used during recruiting processes.

Each of the networking circuits 104a-104d may be configured to communicate over one or more network links in accordance with one or more network protocols such as, for example, Wi-Fi, LTE, wired Ethernet, DOCSIS, DSL, Fiber Channel Protocol, and/or any other suitable protocol.

The input devices 105a-105d may comprise, for example, a mouse, a touchpad, a motion sensor, a trackball, a voice recognition device, a keyboard, and/or any other suitable input device, with accompanying circuitry, that enables a user to interact with the respective terminal 102a, 102b, 128a, or 128b.

Each of the instances 110a and 110b of the recruiting application 110 may comprise code that, when executed, results in the performance of one or more of the processes described in this disclosure. The process(es) may include, for example, providing a candidate-side user interface, processing of recruiting data, and/or communications among components of the recruiting system (e.g., via one or more web-based application programming interfaces). The process(es) may be performed by the candidate terminal on which the code is executed, by the server(s) 114, by a recruiter terminal, and/or by a combination thereof.

Each of the instances 130a and 130b of the recruiting application 130 may comprise code that, when executed, results in the performance of one or more of the processes described in this disclosure. The process(es) may include, for example, providing an organization-side user interface, processing of recruiting data, and/or communications among components of the recruiting system (e.g., via one or more web-based application programming interfaces). The process(es) may be performed by the recruiter terminal on which the code is executed, by the server(s) 114, by a candidate terminal, and/or by a combination thereof.

Each of the instances 112a-112d of the web-browser application 112 may comprise code that, when executed, enables accessing a web-based interface served by the server(s) 114. For example, the server(s) 114 may serve an HTML and/or scripting language-based website that is accessible via the web-browser application 112. Communications between the web-browser 112 and the server(s) 114 may result in the performance of one or more of the processes described in this disclosure. The process(es) may include, for example, providing an organization-side user interface, providing a candidate-side user interface, processing of recruiting data, and/or communications among components of the recruiting system (e.g., via one or more web-based application programming interfaces). The process(es) may comprise client-side processes (e.g., processes performed on the candidate or recruiter terminal by the web-browser 112 and/or its "plug-ins") and/or server-side processes (e.g., processes performed on the server(s) 114 by the server application 126).

Figure 2A:
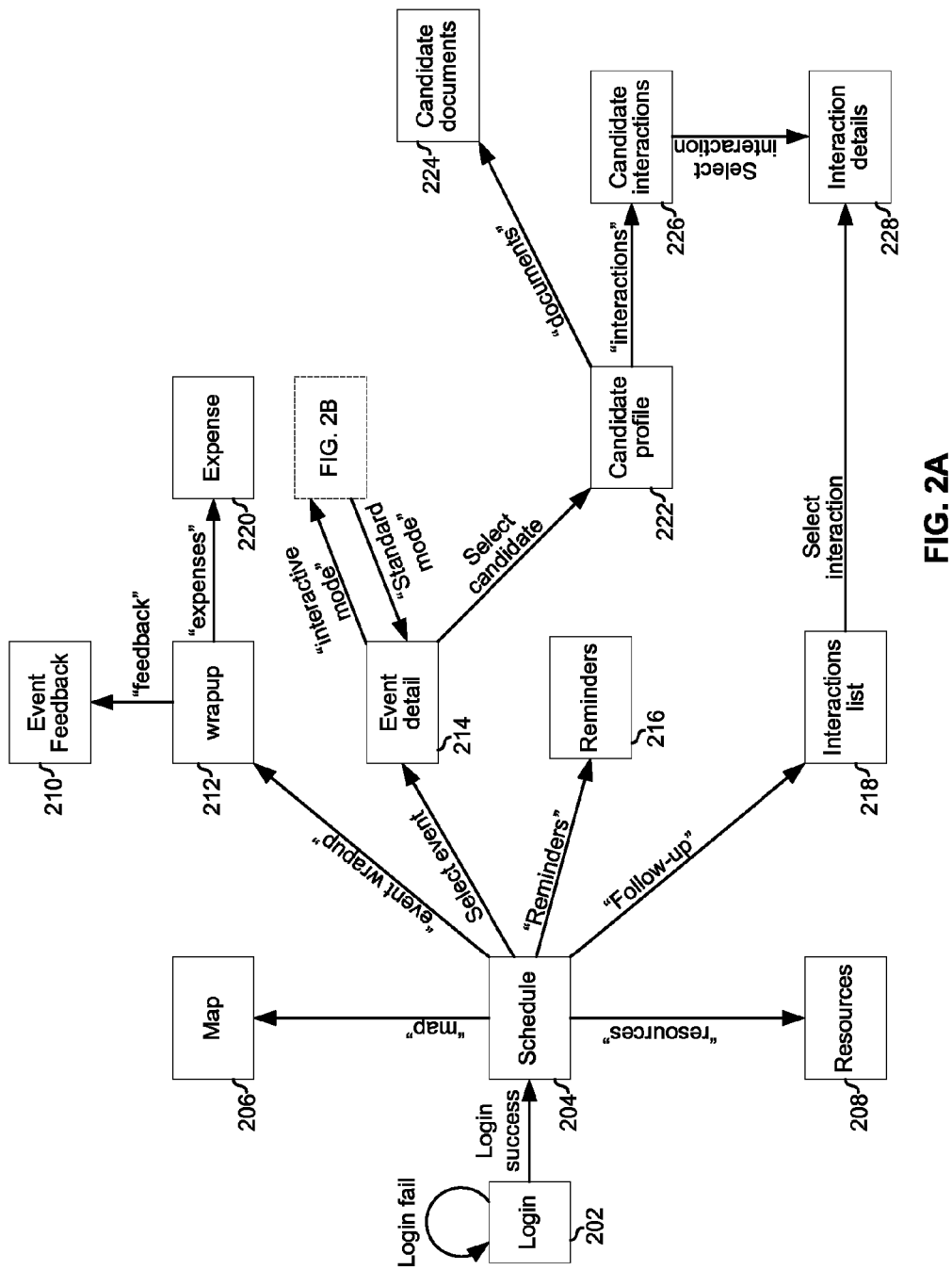
FIGS. 2A and 2B depict a state diagram illustrating operation of an example recruiting terminal.
Figure 2B:
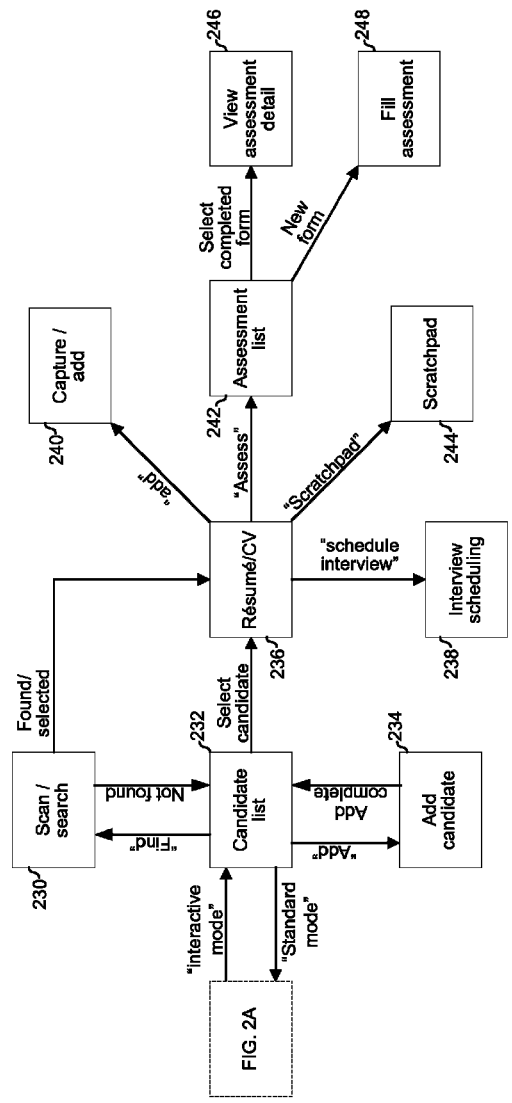

FIGS. 2A and 2B depict a state diagram illustrating operation of an example recruiting terminal. For ease and clarity of description, the state diagram is described in the context of a recruiter ("Recruiter") acting on behalf of an organization ("Organization") (e.g., an employer, a non-profit association, etc.) using the terminal 128a at a recruiting event (e.g., a job-fair, a membership drive, etc.) Although particular windows are described as possessing particular interface elements for navigating to particular other windows, the sequence in which the various states are accessible, the interface elements and/or information available in any particular state, and the number of states are not limited to example implementations disclosed herein.

The recruiting terminal 128a may initialize to a state 202 in which a login window is displayed. If Recruiter enters valid login credentials then the state of the terminal 128b changes to a state 204 in which a "schedule" window is displayed. An example "schedule" window is described below with reference to FIG. 3A.

While in the state 204, Recruiter may interact (e.g., by touching, clicking, typing in, etc.) with one or more interface elements (e.g., buttons, sliders, drop-down menus, etc.) of the schedule window to navigate to a state 206 in which a map function of the terminal 128a is launched. In the state 206, Recruiter may, for example, view street-level maps and/or indoor maps of recruiting events.

While in the state 204, Recruiter may interact with one or more interface elements of the schedule window to navigate to a state 208 in which a "resources" (or "tools") window is displayed. The resources window may provide, for example, documents (e.g., digitally executable waivers, confidentiality agreements, etc.), media (e.g., Organization's promotional and/or orientation videos), and/or other information which Recruiter may need or desire to access during the recruiting event. For example, a link to a document (e.g., a confidentiality agreement, waiver, etc.) requiring a candidate's signature may be provided in the resources window and, upon interacting with the link, the document may be brought up for the candidate to review and for the candidate to digitally sign (e.g., write a signature with a stylus on a touchscreen, provide a finger print via an optical reader, take a picture of his/her face, type in a private-key, etc.). The documents, media, and/or other resources available may be specific to Organization, Recruiter, and/or the particular event. That is, different resources may be available depending on the organization, the event, and/or the recruiter logged-in to the terminal 128a.

While in the state 204, Recruiter may interact with one or more interface elements of the schedule window to navigate to the state 212 in which an "event wrap-up" window is displayed. An example event wrap-up window is described below with reference to FIG. 3G.

While in the state 204, Recruiter may interact with one or more interface elements of the schedule window to navigate to the state 214 in which an "event detail" window is displayed. An example event detail window is described below with reference to FIG. 3B.

While in the state 204, Recruiter may interact with one or more interface elements of the schedule window to navigate to state 216 in which a "reminders" window is displayed. The reminders window may display a task list and/or calendar view of upcoming recruiting-related events, appointments, deadlines, etc. Via interface elements of the reminders window, Recruiter may be enabled to view, sort, filter, set, clear, and/or otherwise manage reminders.

While in the state 204, Recruiter may interact with one or more interface elements of the schedule window to navigate to state 218 in which an "interactions list" window may be displayed. An example interactions list window is described below with reference to FIG. 3F.

While in the state 212, Recruiter may interact with one or more interface elements of the wrap-up window to navigate to state 210 in which an "event feedback" window is displayed. The event feedback window may provide fillable forms, surveys, and/or other user interface elements for collecting information about the recruiting event from the recruiters who attended the event. Such information may be stored (e.g., in memory 108 and/or memory 122) for later generating various event and/or recruiting-related metrics (e.g., to assess Recruiter performance, cost-effectiveness of recruiting processes, etc.)

While in the state 212, Recruiter may interact with one or more interface elements of the wrap-up window to navigate to state 220 in which an "expense report" window is displayed. The expense report window may provide fillable forms and/or other user interface elements for collecting expense reports to enable reimbursement as well analysis and management of recruiting budgets, cost-effectiveness, etc.

While in the state 214, Recruiter may interact with one or more interface elements of the event detail window to navigate to state 232 in which a "candidate list" window is displayed. An example candidate list window is described below with reference to FIGS. 4A and 4B.

While in the state 214, Recruiter may interact with one or more interface elements of the event detail window to navigate to state 222 in which a candidate profile window is displayed. An example candidate profile window is described below with reference to FIG. 3C.

While in the state 218, Recruiter may interact with one or more interface elements of the interactions list window to navigate to state 228 in which an "interaction details" window is displayed. Interface elements of the interactions detail window may enable Recruiter to view and/or edit (e.g., add contact information, a photo, type a note, etc.) past interactions with one or more people (e.g., candidates, other recruiters, organization members/employees, etc.).

While in the state 222, Recruiter may interact with one or more interface elements of the candidate profile window to navigate to state 224 in which a "candidate documents" window is displayed. An example candidate documents window is described below with reference to FIG. 3E.

While in the state 222, Recruiter may interact with one or more interface elements of the candidate profile window to navigate to state 226 in which a "candidate interactions" window is displayed. An example candidate interactions window is described below with reference to FIG. 3D.

While in the state 232, Recruiter may interact with one or more interface elements of the candidate list window to navigate to state 230 in which a candidate scan/search window is displayed. While in state 230, the terminal 128a may be configured to scan (e.g., optically read a QR code, wirelessly read an RFID tag, and/or receive a wireless signature) a candidate terminal (e.g., terminal 102a) to recover a unique identifier, and then search a database of candidates (e.g., stored in memory 108 and/or memory 122) for a candidate associated with the unique identifier. Additionally or alternatively, Recruiter can manually enter candidate information and search for a database record matching the entered information. If a matching record is found, the state of the terminal 128a proceeds to state 236 in which a "candidate résumé/CV window" is displayed, but if no matching record is found, the state of the terminal returns to state 232.

While in the state 232, Recruiter may interact with one or more interface elements of the candidate list window to manually select a candidate ("Candidate") from the list. Upon selection of Candidate the state of the terminal 128a proceeds to state 236 in which a "candidate résumé/CV window" is displayed. An example candidate résumé/CV window is described below with reference to FIG. 4A.

While in the state 232, Recruiter may interact with one or more interface elements of the candidate list window to navigate to state 234 in which an "add candidate" window is displayed. Interface elements of the add candidate window may enable entering candidate information to add a new candidate to the list of candidates. Upon completion of entering the candidate information, the state of the terminal 128a may return to the state 232.

While in the state 236, Recruiter may interact with one or more interface elements of the résumé/CV window to navigate to state 240 in which a "résumé/CV capture/add" window is displayed. While in the state 240, the Recruiter may be enabled to obtain Candidate's résumé/CV and save the résumé/CV to memory such that it is associated with Candidate in memory. The résumé/CV may be obtained by, for example, scanning a paper copy, taking a photo of a paper copy, receiving it via a wired or wireless connection to a candidate terminal, and/or downloading it from the server(s) 114 and/or another web-host.

While in the state 236, Recruiter may interact with one or more interface elements of the résumé/CV window to navigate to state 238 in which a "schedule interview(s)" window is displayed. Example schedule interview windows are described below with reference to FIGS. 4F and 4G.

While in the state 236, Recruiter may interact with one or more interface elements of the résumé/CV window to navigate to state 244 in which a "scratchpad" window is displayed. An example scratchpad window is described below with reference to FIG. 4E.

While in the state 236, Recruiter may interact with one or more interface elements of the résumé/CV window to navigate to state 242 in which an "assessments list" window is displayed. An example assessments list window is described below with reference to FIG. 4B.

While in the state 242, Recruiter may interact with one or more interface elements of the résumé/CV window to navigate to state 248 in which a "view assessment detail" window is displayed. An example view assessment detail window is described below with reference to FIG. 4C.

While in the state 242, Recruiter may interact with one or more interface elements of the résumé/CV window to navigate to state 248 in which a "fill assessment" window is displayed. An example fill assessment window is described below with reference to FIG. 4D.

Figure 3A:
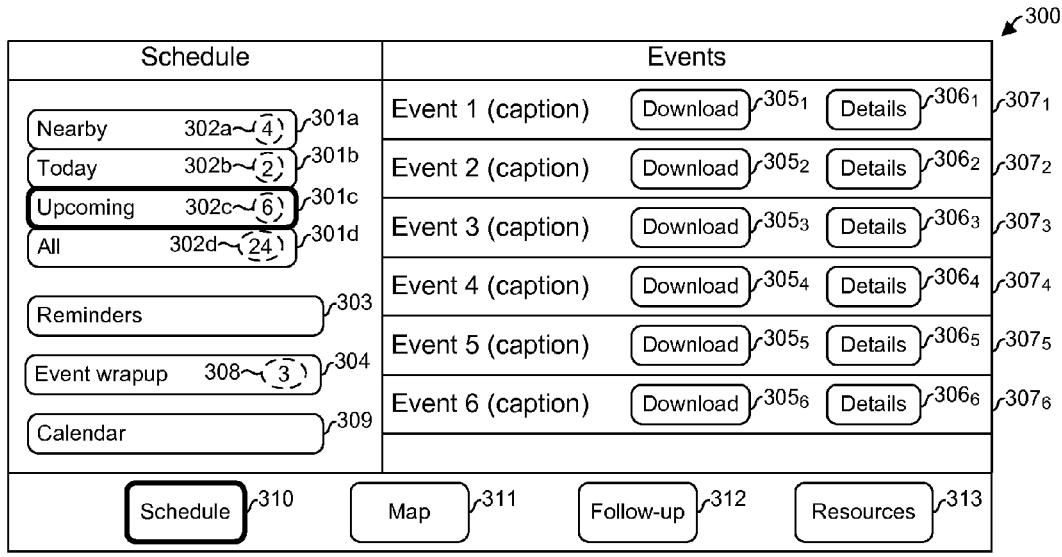
FIG. 3A depicts an example event schedule window displayed on a recruiting terminal.

FIG. 3A depicts an example event schedule window displayed on a recruiting terminal. For ease and clarity of description, it is assumed the event schedule window 300 is being displayed on the terminal 128a.

The interface elements 310, 311, 312, and 313 enable navigating between the scheduling window (FIG. 3A), a map window, an interactions list window (FIG. 3F), and a resources window.

Selection of the interface element 303 (e.g., as a result of being clicked with a mouse or tapped on a touchscreen) may bring up a reminders window. The reminders window may, in turn, display a task list and/or calendar view of upcoming recruiting-related events, appointments, deadlines, etc., and may enable viewing, sorting, filtering, setting, clearing, and/or otherwise managing reminders.

Selection of the interface element 304 may bring up an event wrap-up window such as the one described below with reference to FIG. 3G. The interface element 304 comprises a numerical field 308 indicating how many events are waiting to be wrapped-up by the user of the terminal 128a.

The interface elements 301a-301d may each correspond to a filter to be applied to the list of events to determine which events are displayed in the list. In the example implementation, the filters include: nearby events (e.g., based on GNSS coordinates and/or other location information), today's events, upcoming events, and all events. The underlying data records used to populate the list may be stored in local memory 108c and/or in the memory 122 of the server(s) 114.

Each of the elements 301a-301d comprises a respective one of numerical fields 302a-302d, where the numerical fields give a preview of how many events correspond to such a filter. The numbers shown are arbitrary for ease and clarity of description, and not intended to be limiting. In the example scenario depicted, element 301c is selected (as indicated by the heavy line), and six upcoming events (each corresponding to one of the list entries $307_1$-$307_6$) are displayed in the list.

Each of the list entries $307_1$-$307_6$ corresponds to an event that meets the currently-selected filter criteria ("upcoming events" in the scenario depicted). Each of list entries $307_i$ (i being an integer between 1 and 6) comprises interface elements 305, and $306_i$.

Selection of the interface element $305_i$, may cause candidate profiles, resources, and/or other data associated with the event i to be downloaded to the terminal 128a from the server(s) 114. In this manner, any and/or all data needed for an event may be stored locally on the terminal 128a for offline access. Where memory on the terminal 128a is limited and/or where the terminal 128a is guaranteed network access for the duration of the event, such downloading may be unnecessary and/or undesirable. Where the terminal 128a does operate in an offline mode, data in the memory 108c and data in the memory 122 may be occasionally (e.g., upon establishment of a network connection and/or upon request) and/or periodically be synchronized such that data on both the terminal 128a and the server(s) 114 remains up-to-date to the extent possible and/or desired. Maintaining the data on the server(s) 114 up-to-date may enable other recruiting terminals and/or candidate terminals to access the data at or near real-time (where such other terminals have the appropriate permissions to access such data).

Selection of the interface element 309 may bring up a calendar window which may contain the logged-in user's calendar information, calendar information for other members of the entity for which the logged-in user is recruiting, calendar information for candidates, etc. The calendar window may be similar to, link to, or be a sub, or superset of, the interview scheduling window described below with reference to FIGS. 4F and 4G.

Figure 3B:
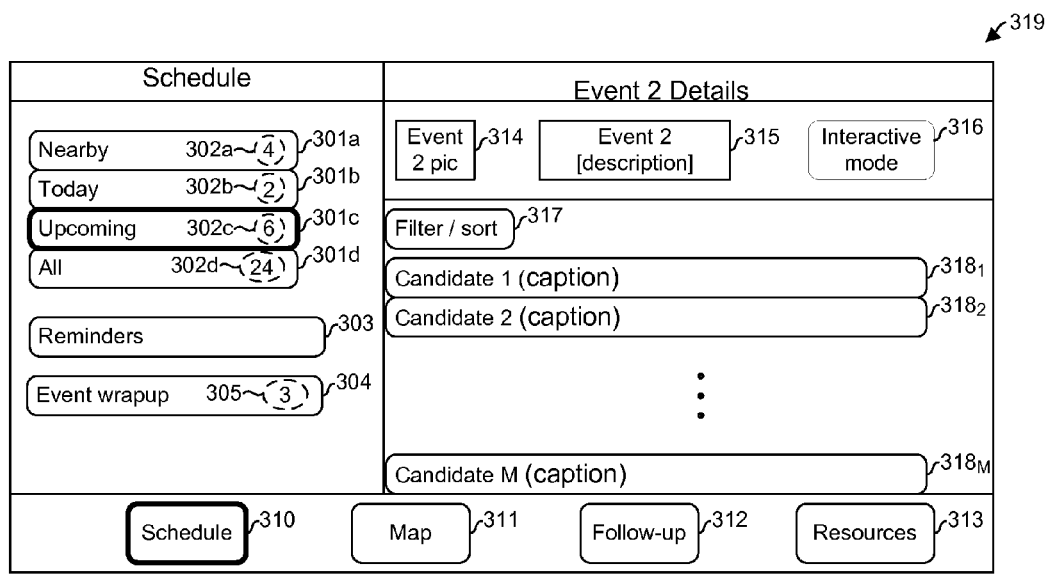
FIG. 3B depicts an example event detail window displayed on a recruiting terminal.

Selection of the interface element $306_i$ may bring up an event details window such as shown in FIG. 3B.

FIG. 3B depicts an example event detail window displayed on a recruiting terminal. In FIG. 3B there is shown an event details window 319. For ease and clarity of description, it is assumed that the window 319 is being displayed in response to selection, by Recruiter, of the interface element $306_2$ (FIG. 3A) corresponding to Event 2.

The interface element 314 is a profile picture for Event 2. The picture may, for example, have been selected by an event coordinator via an event administration interface. The interface element 315 may comprise a brief description of Event 2. For example, the interface element 315 may comprise the name, date, and location of Event 2.

Figure 4A:
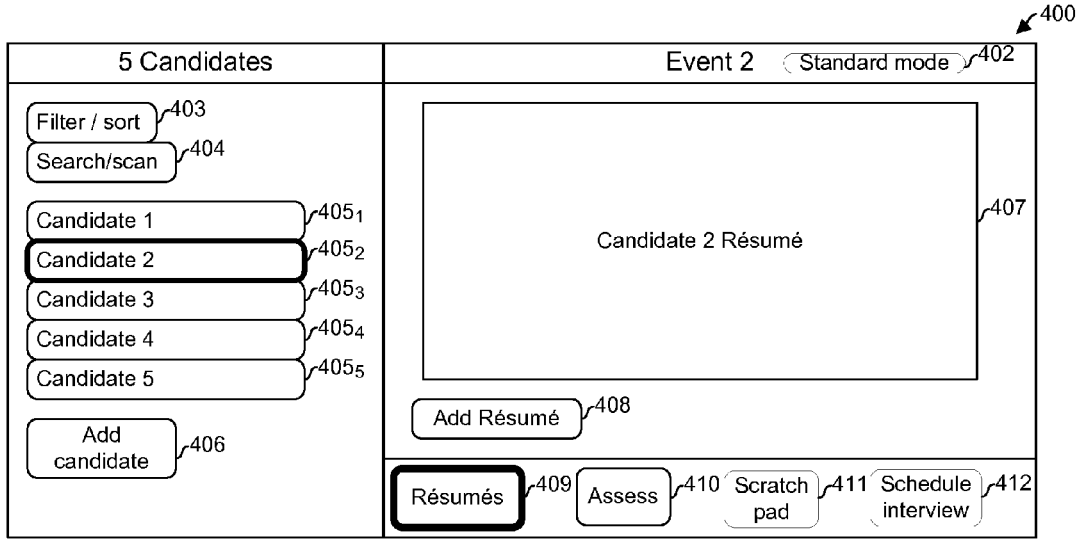
FIG. 4A depicts an example candidate résumé/CV window displayed by an example recruiting terminal.

Selection of the interface element 316 may bring up a candidate list window such as shown in FIG. 4A.

Each of the interface elements $318_1$-$318_M$ (M being an arbitrary integer) may be generated from underlying candidate data records stored in local memory 108c and/or in the memory 122 of the server(s) 114. Each of the interface elements $318_1$-$318_M$ corresponds to a candidate who meets the selected filtering criteria established via interface element 317. Thus, in the scenario depicted, M candidates meet the current filtering criteria. The elements $318_1$-$318_M$ may be sorted by, for example, a cultural fit score (discussed in more detail below) and/or by any other field of information in the underlying data records stored in memory. As an example, interface element 317 may enable filtering by: candidates who registered for Event 2; candidates who attended, or are in attendance, at Event 2; candidates who have been seen by Recruiter or another recruiter working for Organization; and candidates who, after being screened, have been invited for further screening/interviewing with Organization.

Each element $318_m$ (m being an integer between 1 and M) may comprise a caption that provides quick-glance information (e.g., name, college major, cultural fit with Organization, and/or any other suitable information) that may inform Recruiter as to which candidate is which. Selection of the element $318_m$ may bring up the candidate profile window 329 shown in FIG. 3C.

Figure 3C:
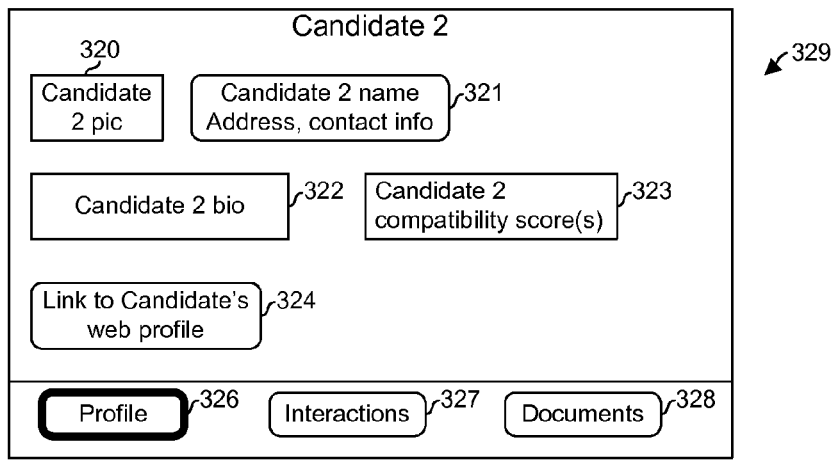
FIG. 3C depicts an example candidate profile window displayed on a recruiting terminal.

FIG. 3C depicts an example candidate profile window displayed on a recruiting terminal. The candidate profile window 329 comprises interface elements 320-328. For ease and clarity of description, it is assumed that the window 329 is being displayed in response to selection, by Recruiter, of the interface element $318_2$ (FIG. 3B) corresponding to Candidate 2 by Recruiter.

The interface element 320 is a profile picture for Candidate 2. The picture may, for example, have been uploaded by Candidate 2 or taken of Candidate 2 at Event 2 or a previous event.

The interface element 322 may comprise a biography of Candidate 2. The biography may, for example, have been uploaded to the server(s) 114 by Candidate 2 prior to Event 2 and/or scanned or typed into a registration terminal at Event 2.

The interface element 323 may comprise one or more scores that indicate a compatibility between Candidate 2 and Organization, between Candidate 2 and one or more of Organization's open requisitions (e.g., open jobs within an Employer and/or positions within an association), and/or between Candidate 2 and Recruiter. In an example implementation, the score(s) may be based on a cultural fit, as described in more detail below with reference to, for example, FIG. 12.

Selection of the interface element 324 may bring up an online profile of Candidate 2. An example online profile is described below with reference to FIGS. 8A and 8B.

The interface element 321 may comprise contact info for Candidate 2. Selection of information in the interface element 321 may bring up an appropriate application for contacting Candidate 2. For example, in response to selection of an email link in the interface element 321, an e-mail app may open on the recruiting terminal. As another example, selection of a "messaging" link in the interface element 321, a messaging window may appear in which Recruiter can enter the message. Clicking "send" may then, for example, cause the message to be delivered via a method selected by Candidate 2. Example methods include email, SMS, and a messaging component of Candidate 2's online profile.

Figure 3D:
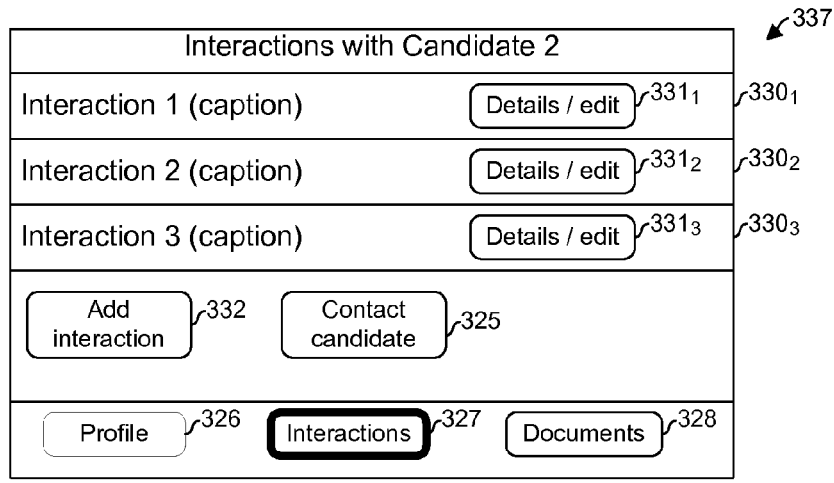
FIG. 3D depicts an example candidate interactions window displayed on a recruiting terminal.
Figure 3E:
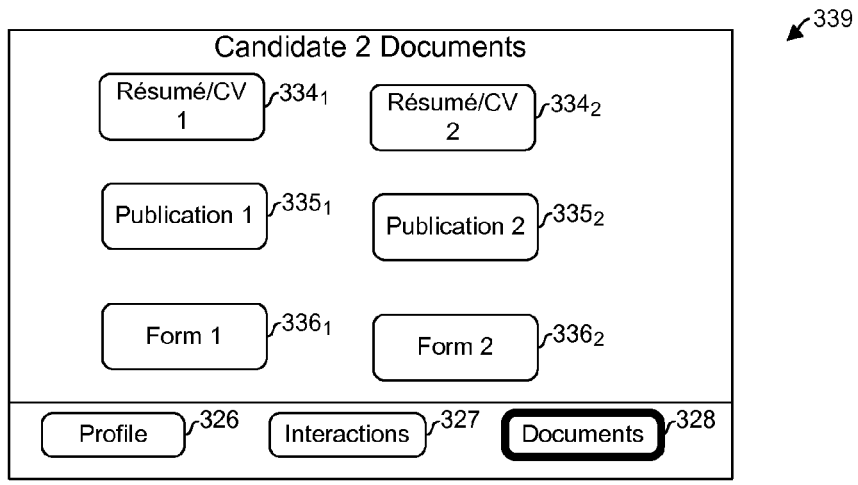
FIG. 3E depicts an example candidate documents window displayed on a recruiting terminal.

The interface elements 326, 327, and 328 provide for navigating between the window 329 of FIG. 3C, the window 337 of FIG. 3D, and window 339 of FIG. 3E.

FIG. 3D depicts an example candidate interactions window displayed on a recruiting terminal. The candidate interactions window 337 comprises interface elements $330_1$-$330_3$, $331_1$-$331_3$, 332, and 325 in addition to previously-discussed interface elements 326-328. For ease and clarity of description, it is assumed that the window 337 is being displayed in response to selection, by Recruiter, of the interface element 327 in the window 329 of FIG. 3C.

Each of the interface elements $330_1$-$330_3$ (where three is an arbitrary number chosen for ease and clarity of description and not intended to be limiting) corresponds to an interaction with Candidate 2. An interaction could be, for example, a formal or informal meeting, an interview, a phone call, an email, etc.

Each of the interface elements $330_1$-$330_3$ comprises a caption that provides at-a-glance information (e.g., date and location) to aid Recruiter in determining which interaction is which. Each interface elements $330_i$ (i being an integer between 1 and 3, in the depicted example) comprises an interface element $331_i$, selection of which brings up an interaction details window which may provide more in-depth information about interaction i with candidate 2. Such information may, for example, include: Candidate 2 profile information, recruiting event profile information if interaction i was a recruiting event, a map of the location of interaction i, and notes taken during interaction i by Recruiter or whichever agent of Organization interacted with Candidate 2 during interaction i.

Each of the interface elements $330_1$-$330_3$ may be generated from candidate data records stored in the memory 108c and/or the memory 122. The interactions data may have been manually entered by a user of a recruiting terminal or other computing device and/or may have been automatically generated. Automatic generation of an interaction may occur, for example, in response to a recruiting terminal coming within a certain distance (e.g., Bluetooth range, Wi-Fi range, an NFC tap, etc.) of a candidate terminal associated with Candidate 2.

Selection of the interface element 332 may bring up a window for manual entry of a new interaction with Candidate 2.

Selection of the interface element 325 may bring up a window for sending a message (e.g., email, SMS, inter-profile message, etc.) to the candidate. Information about the previous interactions with the candidate may be automatically included, or suggested for inclusion, in the message to refresh the candidate's memory as to the identity of the message sender. Additionally or alternatively, the candidate's messaging client may automatically search the candidate's interactions upon receiving the message and display interactions with the message sender alongside the message (e.g, where the sender is a recruiter, the date and location that candidate met with the recruiter may be presented to the candidate along with the message).

FIG. 3E depicts an example candidate documents window displayed on a recruiting terminal. The candidate documents window 339 comprises interface elements $334_1$-$334_2$, $335_1$-$335_2$, and $336_1$-$336_2$ in addition to previously-discussed interface elements 326-328. Although two instances of each of the elements 334, 335, and 336 are shown, any number of instances may be present. For ease and clarity of description, it is assumed that the window 339 is being displayed in response to selection, by Recruiter, of the interface element 328 in the window 329 of FIG. 3C.

Selection of the interface element $334_i$ (where i is an integer between 1 and 2) may bring up a window in which a corresponding one of Candidate 2's résumé/CV is displayed (e.g., as a text file or as a .pdf). The different versions of Candidate 2's résumé/CV may correspond, for example, to different times and/or to different requisitions or position sought.

Selection of the interface element $334_i$ (where i is an integer between 1 and 2) may bring up a window in which a corresponding one of Candidate 2's publications is displayed (e.g., as a text file or as a .pdf).

Selection of the interface element $336_i$ (where i is an integer between 1 and 2) may bring up a window in which a corresponding one of Candidate 2's forms is displayed (e.g., as a text file or as a .pdf). One or more of the forms may be, for example, a waiver, a confidentiality agreement, or some other document executed by Candidate 2 and scanned into the electronic recruiting system. Additionally or alternatively, one or more of the forms may be an assessment form, a performance review, a note, or some other document pertaining to candidate 2 generated by Recruiter and/or another agent of Organization.

Figure 3F:
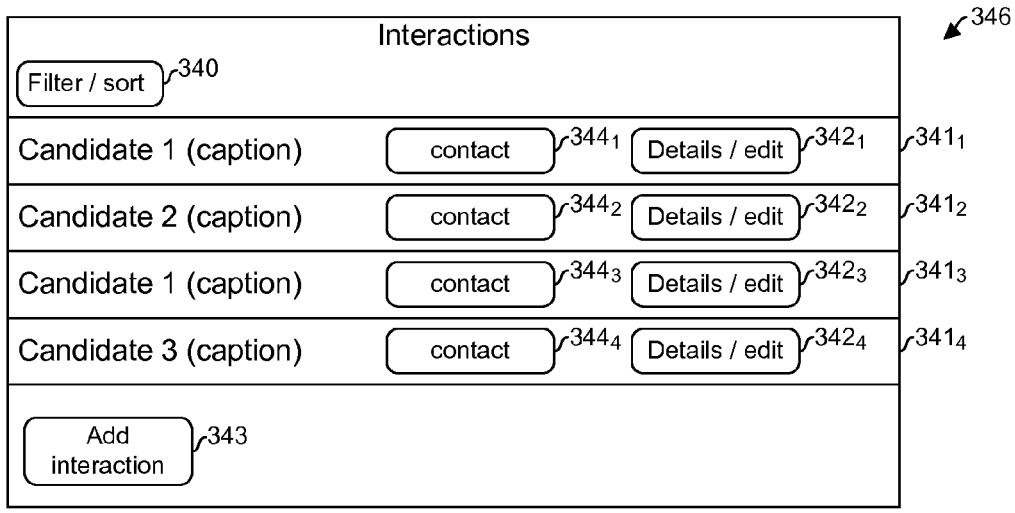
FIG. 3F depicts an example recruiter interactions window displayed on a recruiting terminal.

FIG. 3F depicts an example recruiter interactions window displayed on a recruiting terminal. The window 346 shown in FIG. 3F comprises interface elements 340, $341_1$-$341_4$, $342_1$-$342_4$, and 343. For ease and clarity of description, it is assumed that the window 346 is being displayed in response to selection, by Recruiter, of the interface element 312 in the window 300 of FIG. 3A. The window 246 is similar to the window 337 of FIG. 3D, with the exception that the window 246 lists interactions that specific to Recruiter but not specific to any particular candidate.

Each interface element $341_i$ (where i an integer between 1 and 4 and 4 was arbitrarily chosen for ease and clarity of description) may be similar to one of the interface elements $330_1$-$330_3$. Each interface element $342_i$ (where i an integer between 1 and 4 and 4 was arbitrarily chosen for ease and clarity of description) may be similar to one of the interface elements $331_1$-$331_3$. Each interface element $344_i$ (where i an integer between 1 and 4 and 4 was arbitrarily chosen for ease and clarity of description) may be similar the interface element 325. The interface element 343 may be similar to the interface element 332.

Figure 3G:
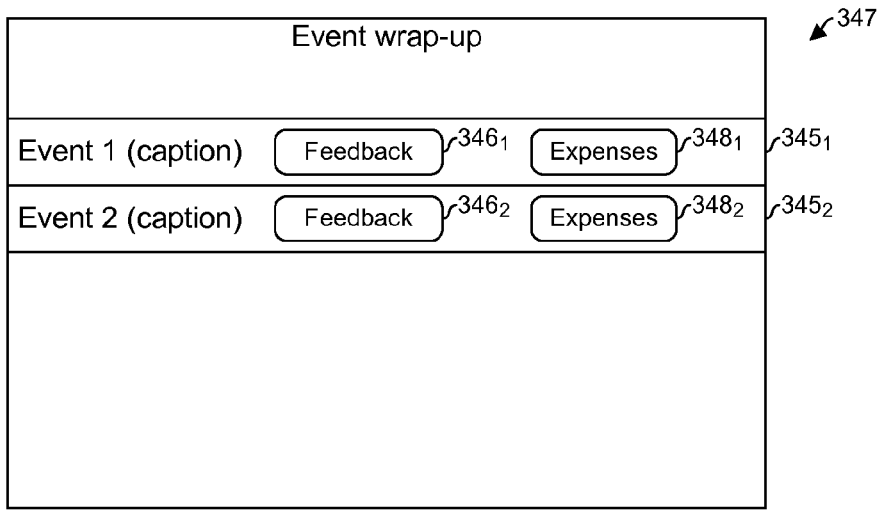
FIG. 3G depicts an example event wrap-up window displayed on a recruiting terminal.

FIG. 3G depicts an example event wrap-up window displayed on a recruiting terminal. The window 347 shown in FIG. 3G comprises interface elements $345_1$-$345_2$, $346_1$-$346_2$, and $348_1$-$348_2$ (two instances of each are shown for ease and clarity of description and the number of instances is not limited). For ease and clarity of description, it is assumed that the window 347 is being displayed in response to selection, by Recruiter, of the interface element 304 in the window 300 of FIG. 3A.

Each of the interface elements $345_1$ and $345_2$ correspond to an event to be wrapped-up. Selection of the interface element $346_i$ (where i is an integer between 1 and 2 in the depicted example) may bring up a window in which Recruiter can enter feedback about the corresponding event. Such feedback may be in the form of, for example, a questionnaire. Selection of the interface element $348_i$ (where i is an integer between 1 and 2 in the depicted example) may bring up a window in which Recruiter can enter an expense report for the corresponding event. By digitally capturing the expense report information, budgeting may be performed in, or near, real-time, and metrics such as cost-effectiveness of events may be analyzed.

Any of the windows described with reference to FIGS. 3A-3G may, for example, be populated by pulling the underlying information from the database(s) 124 via an API.

FIG. 4A depicts an example candidate résumé/CV window displayed on a recruiting terminal. For ease and clarity of description, it is assumed that the window 400 is being displayed in response to selection, by Recruiter, of the interface element 316 in the window 319 of FIG. 3B.

Selection of the interface element 402 may return the terminal 128a to the window 319 of FIG. 3B.

Each of the interface elements $405_1$-$405_5$ may be generated from underlying candidate data records stored in local memory 108c and/or in the memory 122 of the server(s) 114. Each of the interface elements $405_1$-$405_5$ corresponds to a candidate who is associated with Event 2 and that meets the selected filtering criteria established using interface element 403. Thus, in the scenario depicted, five candidates meet the current filtering criteria (where five was arbitrarily selected for ease and clarity of description and is not intended to be limiting). The elements $405_1$-$405_5$ may be sorted by, for example, a cultural fit score (discussed in more detail below) and/or by any other field of information in the underlying data records stored in memory. As an example, interface element 403 may enable filtering by: candidates who registered for Event 2; candidates who attended, or are in attendance, at Event 2; candidates who have been seen by Recruiter or another recruiter working for Organization; and candidates who, after being screened, have been invited for further screening/interviewing with Organization.

Selection of the interface element 402 may bring up a window which may enable searching for a particular candidate among the list of candidates corresponding to elements $405_1$-$405_5$. The search may be performed based on a unique identifier of the particular candidate which may be manually entered by Recruiter (e.g., a name, mobile phone number, email address, etc.) and/or may be entered via an electronic scanning or reading of an article associated with the particular candidate. For example, a barcode or QR code uniquely associated with the particular candidate may be read from the candidate's badge or smartphone. As another example, a unique ID may be read via Bluetooth, Wi-Fi, NFC, USB, and/or any other suitable communication protocol.

Selection of the interface element 406 may bring up a window via which a candidate can be manually entered (e.g., after not being found via a search/scan).

The interface element 407 may display Candidate 2's résumé/CV (e.g., as a text file or .pdf). Selection of the interface element 408 may bring up a window for adding a résumé/CV for Candidate 2 to the system (e.g. a second résumé/CV tailored for different field or position). The résumé/CV may be added by, for example, scanning a paper copy or taking a picture of a paper copy with a camera of the terminal 128a.

Figure 4B:
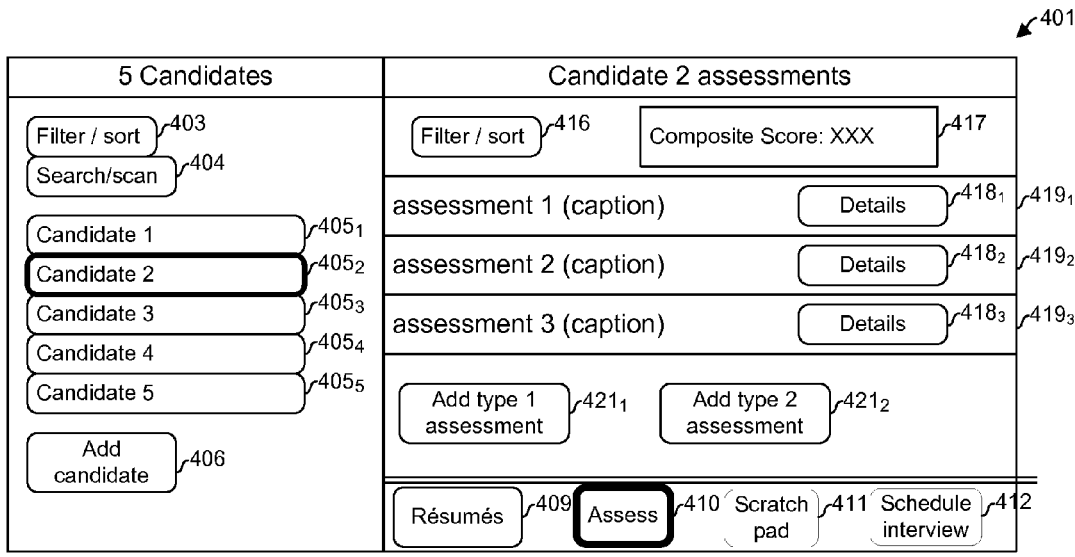
FIG. 4B depicts an example candidate assessment overview window displayed by an example recruiting terminal.
Figure 4D:
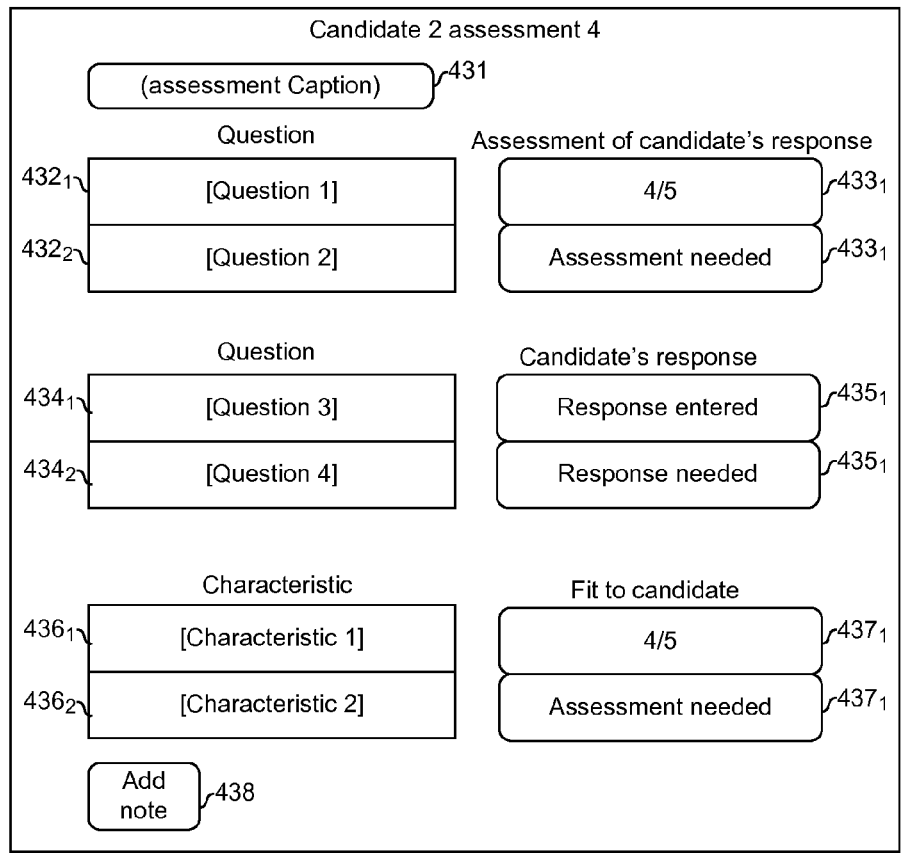
FIG. 4D depicts an example in-progress assessment form window displayed by an example recruiting terminal.
Figure 4E:
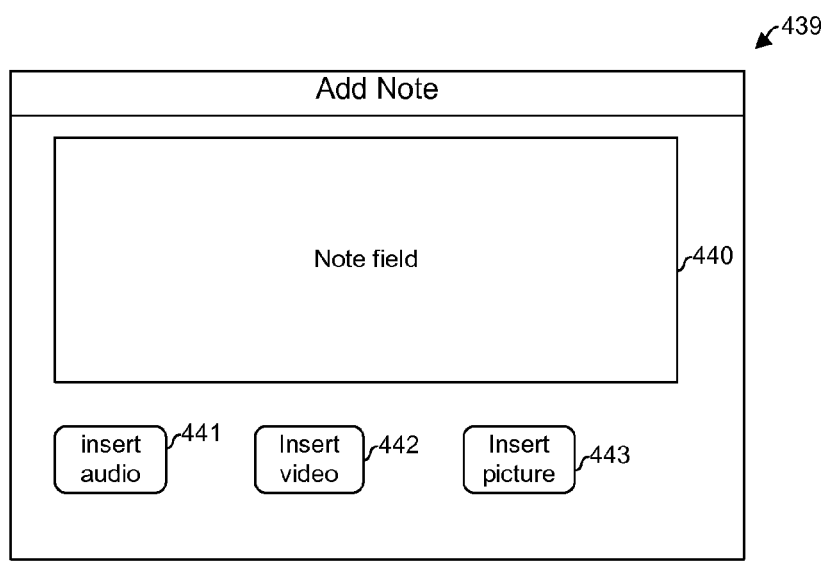
FIG. 4E depicts an example note-taking window displayed by an example recruiting terminal.
Figure 4F:
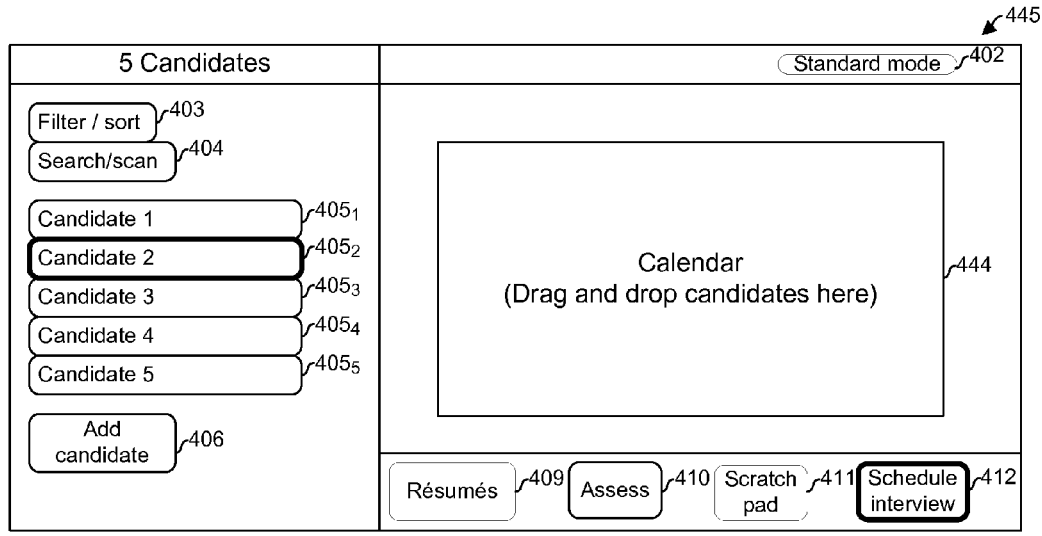
FIG. 4F depicts an example interview scheduling windows displayed on a recruiting terminal.
Figure 4G:
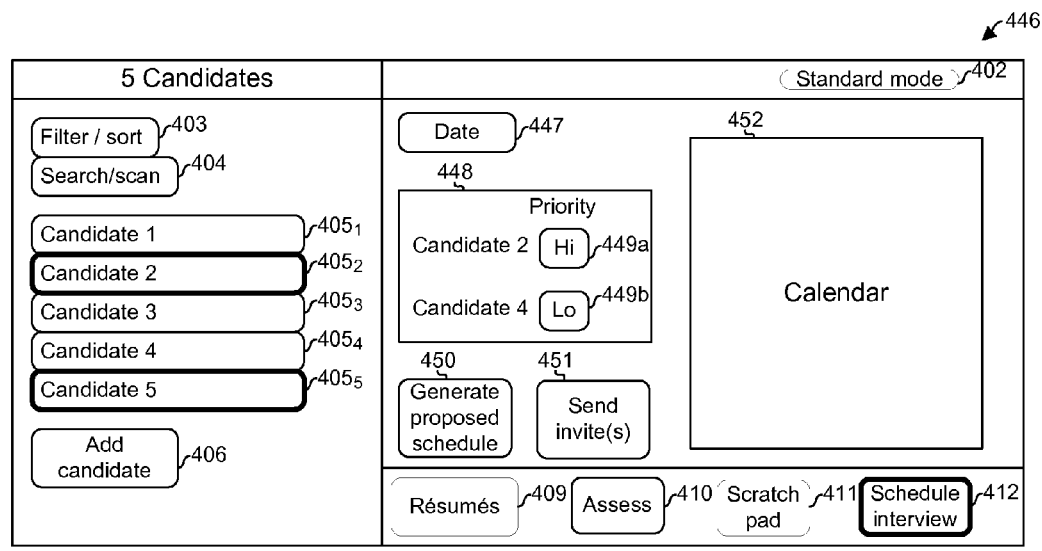
FIG. 4G depicts another example interview scheduling window displayed on a recruiting terminal.

The interface elements 409, 410, 411, and 412 enable navigating between the window 400 (FIG. 4A), an assessments window (FIG. 4B), a scratch pad window (FIG. 4E), and a schedule interview window (FIGS. 4F and 4G).

FIG. 4B depicts an example candidate assessment overview window displayed on a recruiting terminal. For ease and clarity of description, it is assumed that the window 401 is being displayed in response to selection, by Recruiter, of the interface element 410 in the window 400 of FIG. 4A.

The interface element 417 may provide a composite score (e.g., aggregate, mean, and/or median score) for the candidate based on a plurality of previously-completed assessments of the candidate. In an example implementation, a side-by-side comparison of such assessments (e.g., from various recruiters) used in generating the composite score may be viewable on the terminal 128a.

Each of the interface elements $419_1$-$419_3$ (where the number of instances was arbitrarily chosen as three for ease and clarity of description and is not intended to be limiting) corresponds to a completed or ongoing assessment of Candidate 2. Each of the assessment forms may have been completed, or may be in the process of being completed, by Recruiter and/or by another member of Organization (where the proper permissions are in place for Recruiter to view such assessment forms). Example assessment forms are described below with respect to FIGS. 4C and 4D.

Each of the interface elements $419_1$-$419_3$ comprises a caption that provides at-a-glance information (e.g., assessor, date, and location) to aid Recruiter in determining which assessment form is which. Each interface elements $419_i$ (i being an integer between 1 and 3) comprises an interface element $418_i$, selection of which brings up an assessment form window such as described below with respect to FIG. 4C.

The interface element 416 may enable selection of criteria for filtering and/or sorting the assessment forms listed in the window 401. For example, assessment forms may be filtered by date, by assessor, etc.

Each of the interface elements $421_1$ and $421_2$ (where the number of instances was arbitrarily chosen as two for ease and convenience of description and is not intended to be limiting) may bring up an assessment form such as the one described below with reference to FIG. 4D. Where there are multiple instances of the interface element 421, as in FIG. 4B, each form may correspond to a different assessment form, where different forms may be customized for different requisitions/positions, for different recruiters, for different candidates, and/or for different recruiting events.

FIG. 4C depicts an example completed assessment form displayed on a recruiting terminal. The form comprises a caption 430, assessment fields $423_1$ and $423_2$, $425_1$ and $425_2$, and $427_1$ and $427_2$, and an interface element 429 for bringing up a note-taking window such as the one described below with reference to FIG. 4E. For ease and clarity of description, it is assumed that the assessment form is being displayed in response to selection, by Recruiter, of the interface element $419_2$ in the window 401 of FIG. 4B and that the assessment form was completed by Assessor.

The caption 430 may comprise information such as Assessor's name, Candidate 2's name, the date of the assessment, the purpose of the assessment (e.g., the requisition/position for which candidate was being considered), etc.

Each of the assessment fields $423_1$ and $423_2$ (where the number of instances was arbitrarily chosen as two for ease and convenience of description and is not intended to be limiting) may comprise a question asked of Candidate 2 and Assessor's assessment (e.g., in the form a numerical rating from, for example, 1 to 5) of Candidate 2's response to that question.

Each of the assessment fields $425_1$ and $425_2$ (where the number of instances was arbitrarily chosen as two for ease and convenience of description and is not intended to be limiting) may comprise a question asked of Candidate 2 and Candidate 2's response to the question. The candidate's response may be, for example, typed in by Assessor during discussion with Candidate 2, typed in by Candidate 2 (on the recruiter terminal 128a and/or on a candidate terminal and subsequently communicated to the recruiter terminal 128a), and/or recorded via a microphone of the recruiter terminal 128a.

Each of the assessment fields $427_1$ and $427_2$ (where the number of instances was arbitrarily chosen as two for ease and convenience of description and is not intended to be limiting) may comprise a characteristic (e.g., good leadership, motivated, good time management, outgoing, well-spoken, etc.) and the assessor's assessment (e.g., in the form a numerical rating from, for example, 1 to 5) of the extent to which the candidate possesses such characteristic.

Each of the questions/characteristics in fields $423_1$, $423_2$, $427_1$, $427_2$, and 429 may have been selected from a repository of questions either manually by Assessor and/or algorithmically by the terminal 128a and/or server(s) 114 based on various parameters. Example parameters include: a profile of Candidate 2, a profile of Assessor, the requisition/position for which Candidate 2 was assessed, the event at which Candidate 2 was assessed, previously-selected questions/characteristics (in this form and/or in a previous form), and/or answers/assessments to/of previous questions/characteristics (in this form or in a previous form). Information on which the question/characteristic selection was based may be sourced from a profile of Candidate 2 and/or another candidate's profile, a profile of Organization and/or another organization's profile, and/or a profile of the event at which the assessment form was completed. Examples of information found in such profiles are described below with reference to FIGS. 8A, 8B, 9A, 9B, 10A and 10B.

The repository of questions and characteristics from which the questions and characteristics are selected may be questions generated by the assessor and/or other assessors within the Organization. For example, when an assessor generates a new question for a form, that question may be stored into the repository and the assessor may be prompted to enter context information about who, what, where, when, why, and/or how the question/characteristic is being used. In this manner, a sharing (e.g., intra and/or inter-organization sharing, depending on permissions) of assessment questions/characteristics and context information about those questions/characteristics (e.g., perceived merits, deficiencies, recommended use scenarios, etc.) may be enabled by the electronic recruiting system. Such sharing may lead to highly-customized candidate assessments that are more effective and efficient in identifying the best candidates.

Also, the assessment questions/characteristics may be assessed to determine their effectiveness (and deleted, refined, etc., as necessary). For example, after using a particular question/characteristic in assessing a candidate, Recruiter may be prompted (e.g., via a message to Recruiter's profile in the electronic recruiting system) to provide feedback on whether Recruiter believed the question/characteristics to be effective in determining whether the candidate was a good fit. As another example, when a candidate assessed based on a particular question/characteristic is subsequently hired, the effectiveness of that particular question/characteristic may be assessed based on the candidate's subsequent performance reviews.

FIG. 4D depicts an example in-progress assessment form displayed on a recruiting terminal. The assessment form shown in FIG. 4D is similar to the assessment form in FIG. 4C except that the form in FIG. 4D is not yet completed. That is, by interacting with the interface elements $433_1$, $433_2$, $435_1$, $435_2$, $437_1$, and $437_2$, Recruiter can fill-in his/her assessment of Candidate 2.

As discussed above, the questions/characteristics of the form shown in FIG. 4D may be customized for this particular assessment of this particular candidate (Candidate 2) by this particular assessor (Recruiter). The customization may have been prior to Recruiter selecting (in Window 401) the form and/or may occur during completion of the form. The questions/characteristics may have been selected based on, for example, the field in which Candidate 2 is seeking a position, Candidate 2's cultural fit with Organization, Candidate 2's past experience, Candidate 2's purported skills or expertise, Recruiters technical and/or employment background, and/or any characteristics of Recruiter, Candidate, and/or Organization deemed applicable to effective assessment. Where the questions/characteristics are dynamically selected during completion of the form, a subsequent question may be selected on a previous question and/or response/assessment provided for a previous question/characteristic. For example, question $432_2$ may be selected based on the question that was selected for question $432_1$ and/or the response to question $432_1$ provided in interface element $433_1$. In this manner, follow-up questions customized to the ongoing assessment may be selected by Recruiter and/or suggested by the electronic recruiting system.

FIG. 4E depicts an example note-taking window displayed on a recruiting terminal. The note taking window 439 comprises an interface element 440 in which notes can be written or drawn (in the case of a touch screen), typed, dragged-and-dropped (E.g. for pictures and/or video clips), etc. The interface element 441 may bring up a window for selecting an audio clip from memory to be added to the note and/or may bring up an audio recording application (using a microphone of the recruiter terminal 128a) for capturing an audio component of the note. The interface element 442 may bring up a window for selecting a video clip from memory to be added to the note and/or may bring up a video recording application for capturing (using a camera of the recruiter terminal 128a) a video component of the note. The interface element 443 may bring up a window for selecting an image from memory to be added to the note and/or may bring up a picture-taking application for capturing (using a camera of the recruiter terminal 128a) a picture component of the note.

When a note is generated and subsequently saved to memory using the note-taking window, the resulting note may be associated with one or more candidates, organizations, recruiters, and/or events such that the note may be accessible from various windows and/or in various ways from the recruiting terminal 128a. Which candidate(s), organization(s), recruiter(s), and/or event(s) a note is associated with may be selected by the user creating the note and/or may be automatically determined based on context information such as, for example, who is logged into the recruiter terminal 128a, the date and time, the window from which the note-taking window 439 was opened, etc.

FIG. 4F depicts an example interview scheduling window displayed on a recruiting terminal. In FIG. 4F there is a calendar interface element 444 into which one or more of the interface elements $405_1$-$405_5$ may be dragged to schedule interview(s) (or meeting(s) or other interactions) with the candidate(s). In response to dragging the interface element $405_i$ into the element 444, an invite may be sent to Candidate i. An indication of the scheduled interview in window 444 may be displayed in a first manner (e.g., in a first color) before Candidate i accepts the invite and in a second manner (e.g., in a second color) after Candidate i accepts the invite. Upon dragging the element $405_i$ to a particular day on the calendar element 444, the system may check the calendar of Candidate i (which may be stored, for example, on server(s) 114) and then automatically schedule the interaction between Candidate i and Recruiter for a timeslot of that day that is available on both Candidate i and Recruiter's calendars. Where multiple ones of the elements $405_1$-$405_5$ (corresponding to multiple candidates) are dragged to the calendar element 444, the recruiting system may attempt to accommodate the calendars of all selected candidates and Recruiter. Where all cannot be accommodated, the system may prioritize placement of the candidates on the calendar based on, for example, candidate profile information (including a cultural fit score), a priority-level assigned to the candidates by Recruiter (or another member of Organization), and/or priority-levels assigned to Recruiter and/or Organization assigned by the candidates. Priority-levels of candidate assigned by recruiters may be hidden from candidates and priority-levels of organizations assigned by candidates may be hidden from recruiters.

For example, where a first recruiter of a first organization and a second recruiter of a second organization each want to interact with candidate i during the same timeslot on the same day, the system may schedule candidate i to interact with: the recruiter assigned a higher priority by candidate i, the organization assigned a higher priority by candidate i, the organization for which candidate i is a better cultural fit, and/or based on some combination of these and/or other factors.

FIG. 4G depicts another example interview scheduling window displayed on a recruiting terminal. The window 446 in FIG. 4G may be used for automated scheduling of interactions (e.g., interviews) between one or more candidates and one or more recruiters and/or interviewers. The window 446 comprises an interface element 447 for selecting a date or dates to be scheduled. The interface element 452 may display a preview of Recruiter's calendar for the selected date(s). The interface element 448 may display the selected candidates to be scheduled on the selected date(s). Associated with each candidate is an interface element 449 which Recruiter may use to prioritize his/her desire to interact with the selected candidates. Selection of the interface element 450 may cause the recruiting system to process the information in element 448 along with the information in the calendars of the selected candidates to generate a proposed schedule that best accommodates Recruiter's schedule and the selected candidates' schedules based on priority-levels, cultural fit scores, and/or other factors. A preview of a successful scheduling may then be displayed. Such a preview may indicate candidates who could not be scheduled given the current criteria. If the Recruiter is happy with the proposed schedule s/he may then select the interface element 451 to send invites to the selected candidates. If any of the invites are declined, the system may suggest alternate candidates to be scheduled for the timeslots vacated by the declined invitations.

The preceding paragraph described an example implementation in which the candidates' and Recruiter's calendar are taken into account when setting Recruiter's calendar. In another implementation, the calendars of other Recruiters may also be taken into account. For example, each recruiter of each organization and each candidate participating in a recruiting event may submit their desired interactions along with a priority-level of those interactions. Once all submissions are submitted (e.g., at a pre-determined deadline set by the event), the recruiting system may algorithmically populate the calendars of all recruiters and candidates in an attempt to maximize the number of candidates that get to interact with their preferred organizations and/or to maximize the number of preferred candidates that recruiters get to interact with. Such automated scheduling may help minimize scheduling conflicts as compared to the candidates and recruiters manually setting their calendars.

Any of the windows described with reference to FIGS. 4A-4G may, for example, be populated by pulling the underlying information from the database(s) 124 via an API.

Figure 5A:
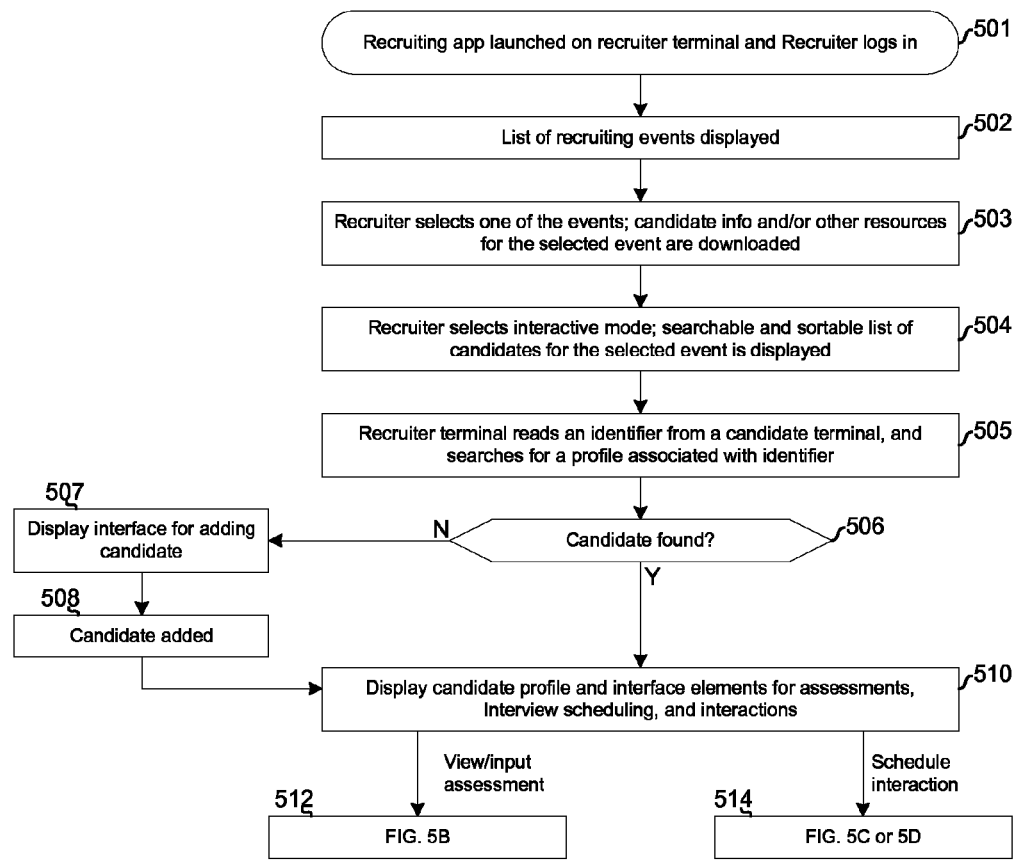
FIGS. 5A-5C depict a flowchart illustrating an example process for at-event management of recruiting information.
Figure 5B:
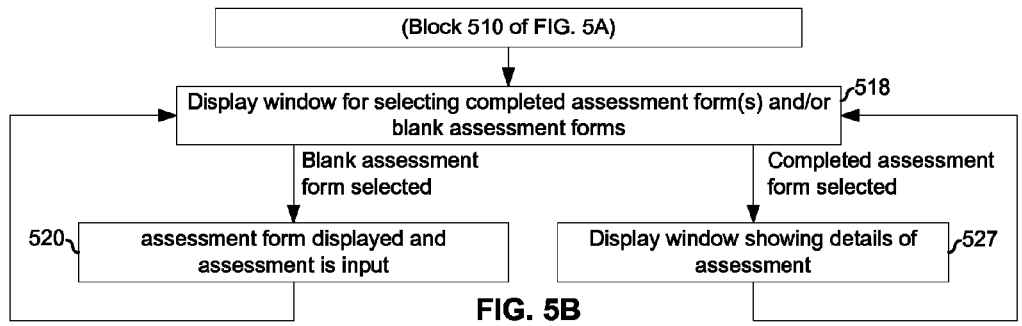
Figure 5C:
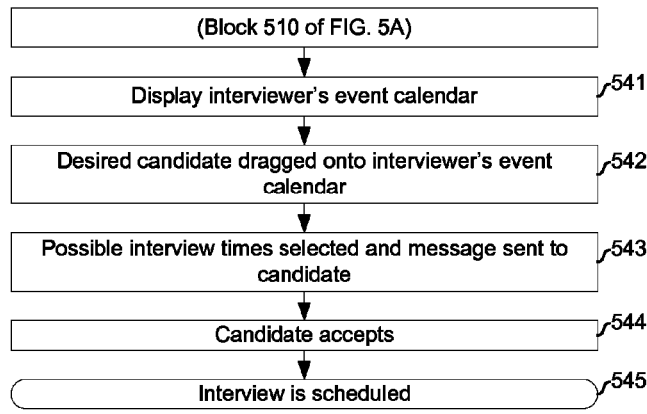

FIGS. 5A-5C depict a flowchart illustrating an example process for at-event management of recruiting information. For ease and clarity of description, the process is described with reference to a recruiter ("Recruiter") using the example recruiting terminal 128a. Referring to FIG. 5A, the example process begins with block 501 in which the recruiting app 130a is launched on the terminal 128a and Recruiter logs in by, for example, typing his username and password. In block 502, a list of past, present, and/or future recruiting events is displayed such as, for example, shown in window 300 of FIG. 3A. In block 503, Recruiter selects one of the events in the list (e.g., by selecting an interface element $305_i$ in FIG. 3A) and, as a result, candidate info (e.g., profiles, résumés/CVs, etc.) and/or other resources (e.g., executable forms, organizational promotional materials, etc.) are downloaded from the server(s) 114 to the terminal 128a. In block 504, Recruiter causes (e.g., by selecting interface element 316) the terminal 128a to display a searchable and/or sortable list of candidates associated with the selected event, such as is shown in window 400 of FIG. 4A. In block 505, the terminal 128a reads an identifier from a candidate terminal (e.g., optically reads a QR code or reads an ID using NFC) and searches the list of candidates for a candidate associated with the read identifier.

In block 506, it is determined whether a candidate associated with the read identifier has been found in the candidate list. If a candidate associated with the read identifier is found, the process proceeds to block 510. If no candidate associated with the read identifier is found, then in block 507 a window for adding a candidate (and associating that candidate with the read identifier) is displayed. In block 508, the candidate's information is entered and the candidate is added to the candidate list (and may be subsequently uploaded to the server(s) 114).

In block 510, a profile and/or résumé/CV of the selected candidate along with interface elements for viewing/inputting assessments of the selected candidate and/or for scheduling an interaction (e.g., interview) with the selected candidate may be displayed and/or made accessible to Recruiter. If Recruiter selects an interface element (e.g. 410) to view and/or input an assessment of the selected candidate, then the process advances to block 512, which is described below with reference to FIG. 5B. If Recruiter selects an interface element (e.g., to schedule an interaction (e.g., an interview) with the selected candidate, then the process advances to block 514, which is described below with reference to FIG. 5C.

Referring to FIG. 5B, in block 518, a window for selecting completed and ongoing assessment forms and/or for selecting a blank assessment form for inputting a new assessment of the selected candidate (e.g., window 401 in FIG. 4B) is displayed. If Recruiter selects an interface element corresponding to a blank assessment form (e.g., element $421_1$), then the process advances to block 520. In block 520, an assessment form, such as the form described above with reference to FIG. 4D, is displayed, and Recruiter inputs his/her assessment of the selected candidate using the interface elements of the form. In instances where the information is input to the assessment form while the terminal 128a does not have a network connection, the completed assessment form may be stored locally on the terminal 128a and uploaded to the server(s) 114 upon the terminal 128a establishing a network connection. Where the terminal 128a does have a network connection while the assessment form is being filled out, the information input to the form may be uploaded to the server(s) 114 and/or shared to other recruiting terminals 128 in, or near, real-time (where the appropriate permissions are in place).

Returning to block 518, if Recruiter selects an interface element (e.g., element $418_1$) corresponding to an assessment form that was previously completed or is currently being filled out on another recruiting terminal, then the process advances to block 527. In block 527, a completed or in-progress assessment form, such as the form described above with reference to FIG. 4C, is displayed. An in-progress assessment form may be viewable on the terminal 128a where there is an existing network connection(s) that connect the terminal 128a to the terminal on which the assessment form is being filled out. Where the assessment form is in-progress and being filled out by another recruiter, Recruiter may or may not have permission to input information into the form or override information input by the other recruiter.

Referring to FIG. 5C, in block 541 an interface element comprising the interviewer's event calendar is displayed on the recruiting terminal. The interviewer may be Recruiter or may be another member of Organization. In block 542, an interface element corresponding to the selected candidate is dragged onto the calendar interface element to a day and/or event for which the interview is to be scheduled. In block 543, the interviewer's calendar and the selected candidate's calendar (which may be stored on the recruiter terminal and/or on the server(s) 114) may be checked to determine a timeslot that works for both. Timeslots meeting such criteria may be presented and the Recruiter may select one or more of them to suggest to the selected candidate. In response to the selection of the timeslot(s) an invitation may be sent to the selected candidate. In block 544 the selected candidate may accept the invitation for one of the timeslots. In block 545 both the interviewer's calendar and the selected candidate's calendar may be updated to reflect the newly-scheduled interview.

Figure 5D:
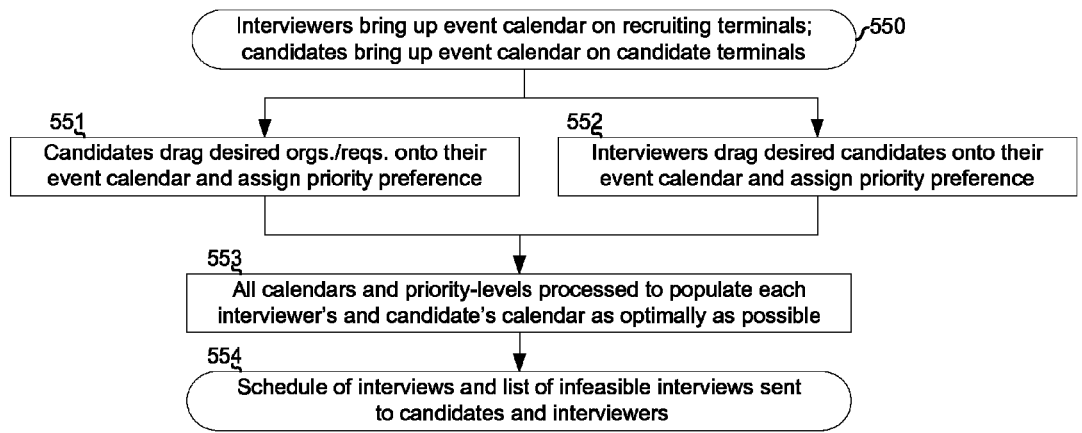
FIG. 5D depicts a flowchart illustrating an example interview scheduling process.

FIG. 5D depicts a flowchart illustrating an example interview scheduling process. Whereas FIG. 5C illustrated a relatively simple process of scheduling a single candidate and a single interviewer, FIG. 5D illustrates a process for scheduling potentially-conflicting interviews of multiple candidates by multiple interviewers. In block 550, each of the multiple interviewers brings up his/her calendar on a recruiting terminal and each of the multiple candidates brings up his/her calendar on a candidate terminal. In block 551, each candidate drags desired organizations and/or interviewers onto his/her calendar and assigns a priority-level to each. In block 552, each interviewer drags desired candidates onto his/her calendar and assigns a priority-level to each. In block 553, the recruiting system processes all of the submitted calendars and their accompanying prioritizations to populate each candidate's calendar and each recruiter's calendar as optimally as possible. That is, to try and maximize the number of candidates who get a timeslot with their highest-priority organizations and/or maximize the number of interviewers who get a timeslot with their highest-priority candidates. In block 554, each interviewer's schedule and each candidate's schedule is saved to his/her respective calendar and a notification that the scheduling is complete is sent to each.

Figure 6:
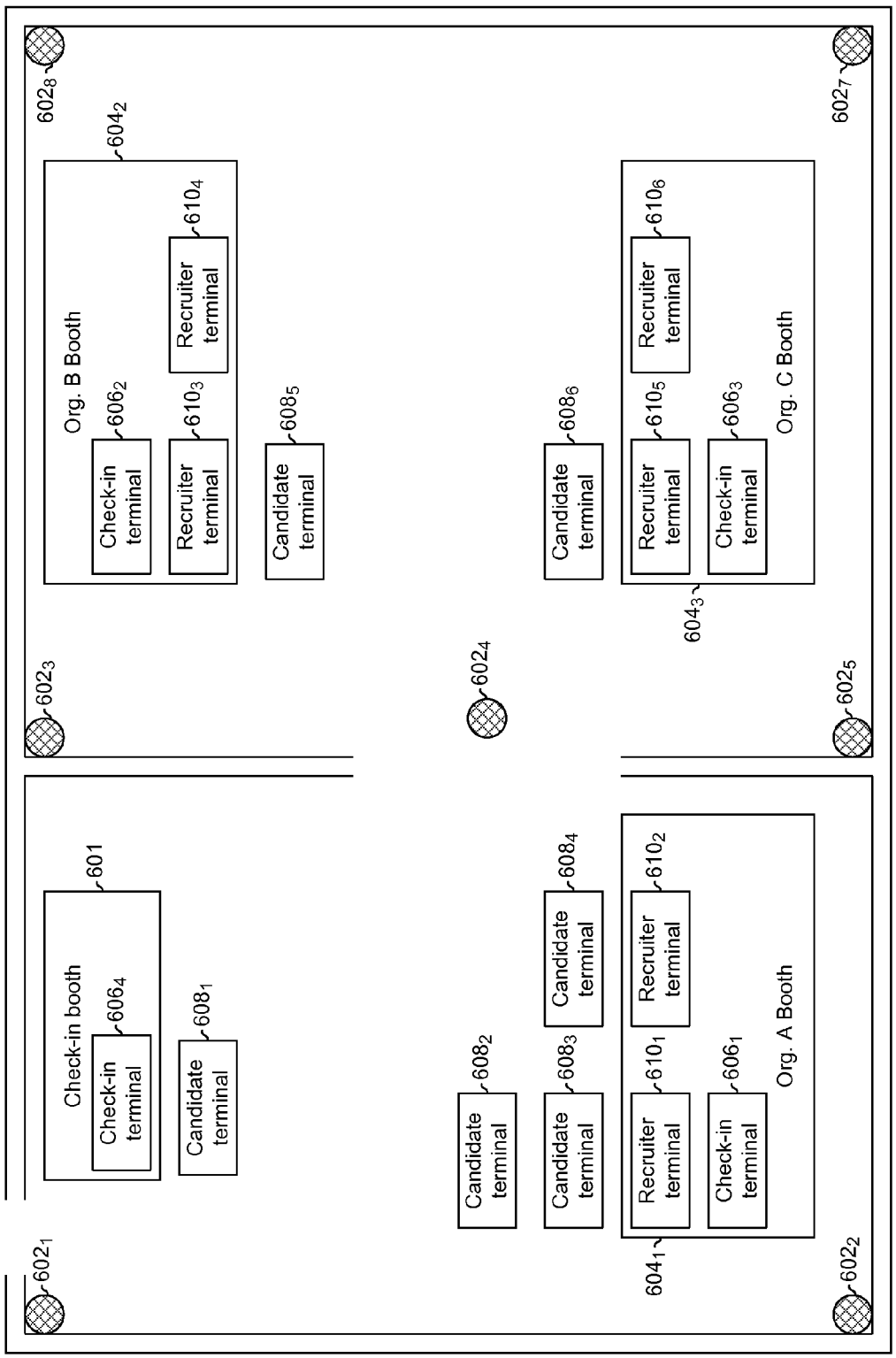
FIG. 6 depicts components of an electronic recruiting management system deployed at a recruiting event.

FIG. 6 depicts components of an electronic recruiting management system deployed at a recruiting event. Shown is a floor plan of an event ("Event") at which there are sensors $602_1$-$602_7$, a check-in booth 601, organization booths $604_1$-$604_3$, check-in terminals $606_1$-$606_4$, candidate terminals $608_1$-$608_6$, and recruiter terminals $610_1$-$610_6$.

Each of candidate terminals $608_1$-$608_6$ may be substantially similar to one of the candidate terminals 102a and 102b described above with reference to FIG. 1. Each of the recruiter terminals $610_1$-$610_6$ may be substantially similar to one of the recruiter terminals 128a and 128b described above with reference to FIG. 1.

Each of the sensors $602_1$-$602_7$ may comprise circuitry configured to wirelessly detect the presence and/or location of recruiting terminals, candidate terminals, and/or other computing devices. Each of the sensors $602_1$-$602_7$ may, for example, passively listen to Wi-Fi and/or other wireless network channels to detect computing devices communicating on those channels. Upon detecting a computing device (e.g., a candidate terminal), the sensors $602_1$-$602_7$ (where i is an integer between 1 and 7) may log the presence of the device by storing a unique identifier (e.g., a MAC address and/or SIM card serial number) of the computing device to memory (e.g., uploading to memory 122). The sensors of the detected computing device may additionally determine, and subsequently log in memory, the location of the detected computing device. Location of devices at the event may be determined by, for example, triangulation based on which of the sensors $602_1$-$602_7$ detected which communications from the computing device at which time, and/or based on signal strength(s) from the detected computing device incident on one or more of the sensors $602_1$-$602_7$. Other methods of indoor navigation may be used in addition to, or instead of, the location determination based on sensors 602.

Each of the check-in terminals $606_1$-$606_4$ may comprise circuitry configured to log candidate and/or recruiter terminals as being present in the immediate vicinity of the check-in terminal. For example, as candidates and/or recruiters enter the event, they may stop by the check-in booth 601 and allow the check-in terminal $606_4$ to scan their respective candidate and recruiter terminals. Upon such a scan, the terminal $606_4$ may update an event roster which may be stored on the server(s) 114 and may be accessible by other candidates, recruiters, and/or event administrators. As another example, as candidates stop by Organization B's booth $604_1$, they may present their respective candidate terminals for scanning by check-in terminal $606_1$. Such scans may be used, for example, to maintain a waiting list for candidates seeking to talk with recruiters of Organization B, for communicating candidate information to Organization B, and/or for communicating Organization B information to the candidates. In an example implementation, each of the check-in terminals $606_1$-$606_4$ may be a recruiter terminal that has been configured into a check-in terminal mode in which only limited functions of the recruiter terminal are accessible until an administrator of the terminal changes the configuration.

To illustrate, at the time instant shown in FIG. 6, information from the sensors $606_1$-$606_4$ may be used to determine that two recruiter terminals ($610_1$ and $610_2$) and three candidate terminals ($608_2$-$608_4$) are at the booth $604_1$, that two recruiter terminals ($610_3$ and $610_4$) and only one candidate terminal ($608_5$) are at booth $604_2$, and that two recruiter terminals ($610_5$ and $610_6$) and only one candidate terminal ($608_6$) are at booth $604_3$. Additionally, historical information from the sensors $606_1$-$606_4$ may be used to determine where the recruiter terminals and/or candidate terminals were previously (e.g., which booths candidates previously visited). Information from the sensors may be used by event administrators to, for example, distribute (e.g., through notification messages to candidate terminals) attendees with a goal of reducing booth wait times and increasing interactions overall. Information from the sensors $606_1$-$606_4$ may be used by event recruiters to, for example, determine which candidates to target, manage recruiter scheduling, determine when to send out notifications for candidate to visit their booths, determine where to locate their booths and/or recruiters, etc. Information from the sensors $606_1$-$606_4$ may be used by candidates to, for example, determine which booths to visit and when, which candidates to network with, etc.

Figure 7A:
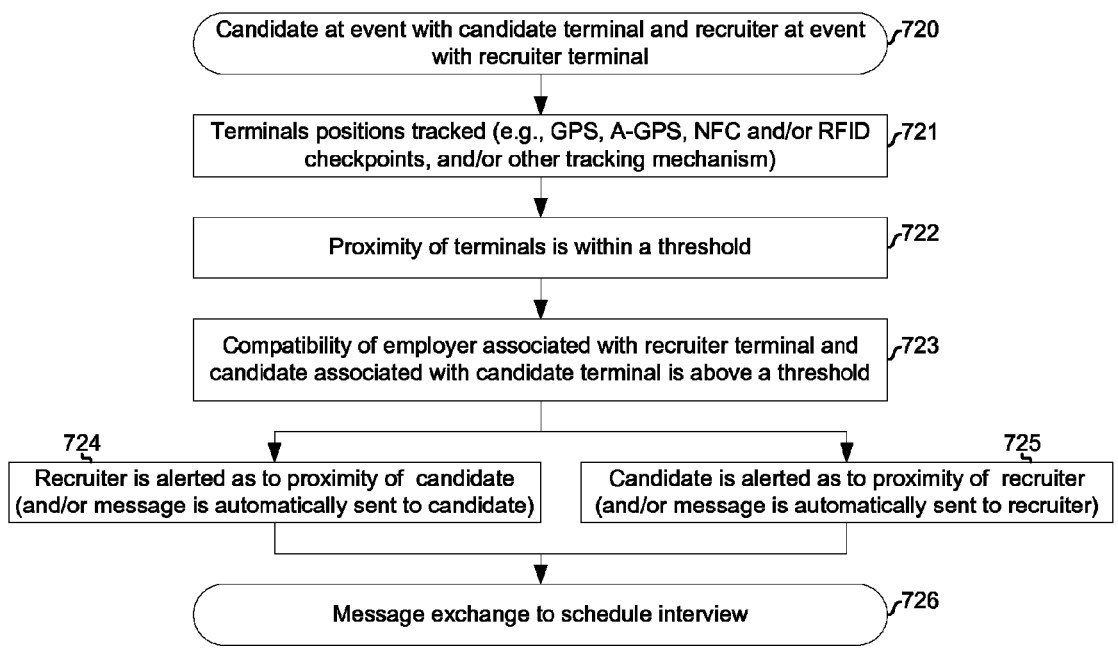
FIG. 7A depicts a flowchart illustrating at-event candidate and recruiter matchmaking using an electronic recruiting management system.

FIG. 7A depicts a flowchart illustrating at-event candidate and recruiter matchmaking using an electronic recruiting management system. In block 720, Candidate is at a recruiting event ("Event") with his/her candidate terminal $608_X$ and a recruiter ("Recruiter") of Organization is at Event with his/her recruiter terminal $610_X$. In block 721, the positions of terminal $608_X$ and terminal $610_X$ are tracked (e.g., via sensors $602_1$-$602_7$). In block 722, it is determined that terminal $608_X$ is within a determined proximity (e.g., 50 feet) of terminal $610_X$. This may occur, for example, when Candidate is walking by Organization's booth. In block 723 it is determined that a compatibility between Candidate and Organization (e.g., based on work cultural and/or personality assessments) is above a threshold.

In block 724, Recruiter is alerted (e.g., via a push notification to his/her recruiter terminal) as to the proximity of Candidate. The alert may include some information about Candidate such as Candidate's college major and/or the compatibility score between Candidate and Organization. In block 725, Candidate is alerted (e.g., via a push notification to his/her candidate terminal) as to the proximity of Recruiter. The alert may include some information about Recruiter and/or Organization such as number and/or types of positions that Organization is looking to fill and/or the compatibility score between Candidate and Organization. In block 726, either or both Candidate and Recruiter may respond to the notification (e.g., Recruiter may push a "send invite" interface element included in the notification and/or Candidate may push a "get on waiting list" interface element included in the notification) to trigger further steps toward an interaction between Candidate and Recruiter.

Figure 7B:
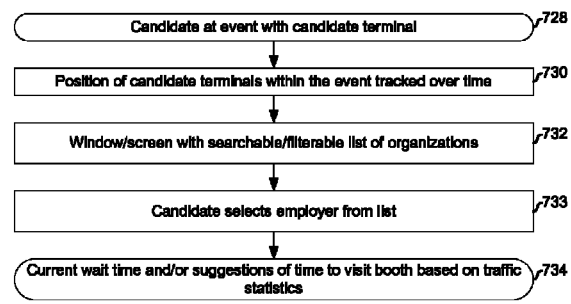
FIG. 7B depicts a flowchart illustrating at-event interview scheduling and coordination using an electronic recruiting management system.

FIG. 7B depicts a flowchart illustrating at-event interview scheduling and coordination using an electronic recruiting management system. The process begins with block 728 in which a plurality of candidates are at the Event depicted in FIG. 6 and carrying their respective candidate terminals. In block 730, as the candidates walk around the event, each candidate's position may be tracked by the sensors $602_1$-$602_7$ and may be logged on the server(s) 114. Additionally, as the candidates check in at various booths 601 and/or 604 and/or interact with recruiters, those events may also be logged on the server(s) 114. In block 732, a particular candidate ("Candidate"), using his/her candidate terminal, pulls up a list of organizations that are at the event and, in block 733, selects an organization with which s/he would like to meet. In block 734, the candidate terminal displays the current approximate wait time for that organization's booth, a suggested time for Candidate to visit the booth, and/or any other information which may be calculated based on the candidate positioning, check-in, and/or interaction information. In another implementation, the list of organizations pulled up in block 732 may be sortable and/or filterable based on, for example, current wait times, whether or not Candidate has already visited the organization's booth, how many candidate have visited the organization's booth, booths that have the most visits by candidates similar in some way to Candidate, and/or any other filtering/sorting parameter which can harness the candidate position tracking information, check-in information, and/or the candidate and organization profile information available in the electronic recruiting system.

Figure 7C:
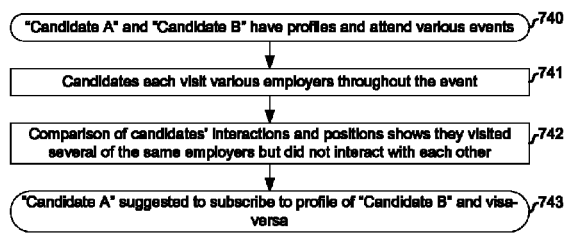
FIG. 7C depicts a flowchart illustrating networking features of an electronic recruiting management system.

FIG. 7C depicts a flowchart illustrating networking features of an electronic recruiting management system. The process of FIG. 7C begins with block 740 in which Candidate A and Candidate B are both at an event carrying their respective candidate terminals. In block 741, the two candidates visit various organization booths and interact with various recruiters over the course of the event. In block 742, an analysis of the two candidates' movements and logged interactions over the course of the event indicates that they visited many of the same booths but did not interact with each other. In response, in block 743, each of the two candidates receives a notification (e.g., email or message to his/her candidate profile) with a recommendation to subscribe to the other and/or meet the other (e.g., at a mixer put on as part of the event or at a future event).

Figure 8A:
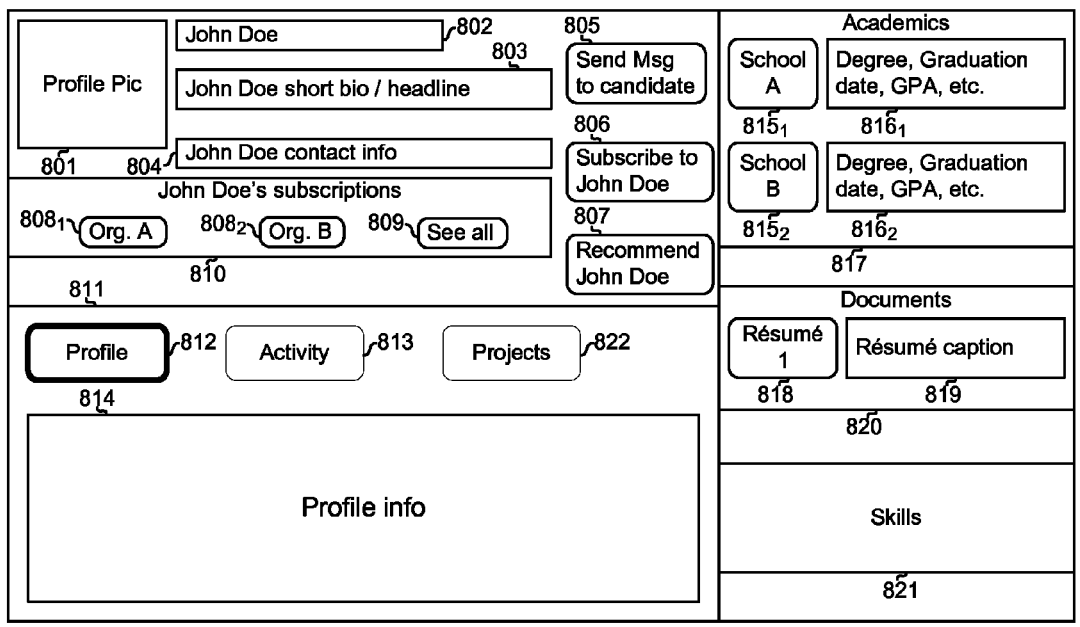
FIG. 8A depicts an example public candidate profile window provided by an electronic recruiting management system.

FIG. 8A depicts an example public candidate profile window provided by an electronic recruiting management system. Shown is a candidate profile window of candidate John Doe. The profile picture interface element 801 comprises a picture that John Doe selected for others to see when viewing his profile. The interface element 802 may comprise the name that John Doe has chosen for others to see when viewing his profile. The interface element 803 comprises a brief description or headline that John Doe has typed in for others to see when viewing his profile. The interface element 804 comprises contact information that John Doe has chosen for others to be able to see when viewing his profile.

Interacting with the interface element 805 may bring up a messaging window for sending a message to John Doe. When a user interacts with the interface element 806, the user's profile may be subscribed to John Doe's profile. When a user interacts with the interface element 807, the user may recommend John Doe (e.g., in general and/or for a specific position) and the recommendation may post to John Doe's profile, the user's profile, and/or may be sent to the organization (e.g., the organizations profile in the electronic recruiting system and/or to the organization's résumé/CV collection email address) to which John Doe is being recommended.

The interface element 810 may comprise a plurality of interface elements 808 each of which corresponds to an organization, candidate, and/or event to which John Doe is subscribed. Clicking on an interface element $808_i$ may open a profile window of the corresponding candidate, organization, or event. Interacting with the interface element 809 may bring up a window displaying all candidates, organizations, and/or events to which John Doe is subscribed. In addition to, or instead of, corresponding to profiles to which John Doe is subscribed, one or more interface elements 808 may correspond to an organization of which John Doe is a member or employee.

The interface element 817 may comprise information about John Doe's academic credentials and may comprise a plurality of interface elements 815 and 816. Each interface element $815_i$ may correspond to a school John Doe attended and the corresponding interface element $816_i$ may comprise details about John Doe's involvement with the school.

The interface element 820 may comprise documents such as John Doe's résumé(s)/CV(s), publications, projects, etc. Interacting with one of the interface elements 818 may bring up a copy (e.g., a .pdf or .html file) of the document associated with the interface element 818. Each interface element 819 may comprise a snapshot, a summary, excerpt, etc., from the corresponding document.

The interface element 821 may comprise a list of skills, characteristics, etc., that pertain to John Doe. The list may be populated from a standardized or uniform set of tags.

When the interface element 812 is selected (as indicated by the heavy line in FIG. 8A), the interface element 814 is displayed in the candidate profile window. The interface element 814 may comprise, for example, work history details, academic history details, affiliations, association memberships, John Doe's interests, John Doe's publications, John Doe's projects, etc. The information interface element 814 may have been manually entered by John Doe, read from documents uploaded by John Doe, and/or imported from other websites or databases.

Figure 8B:
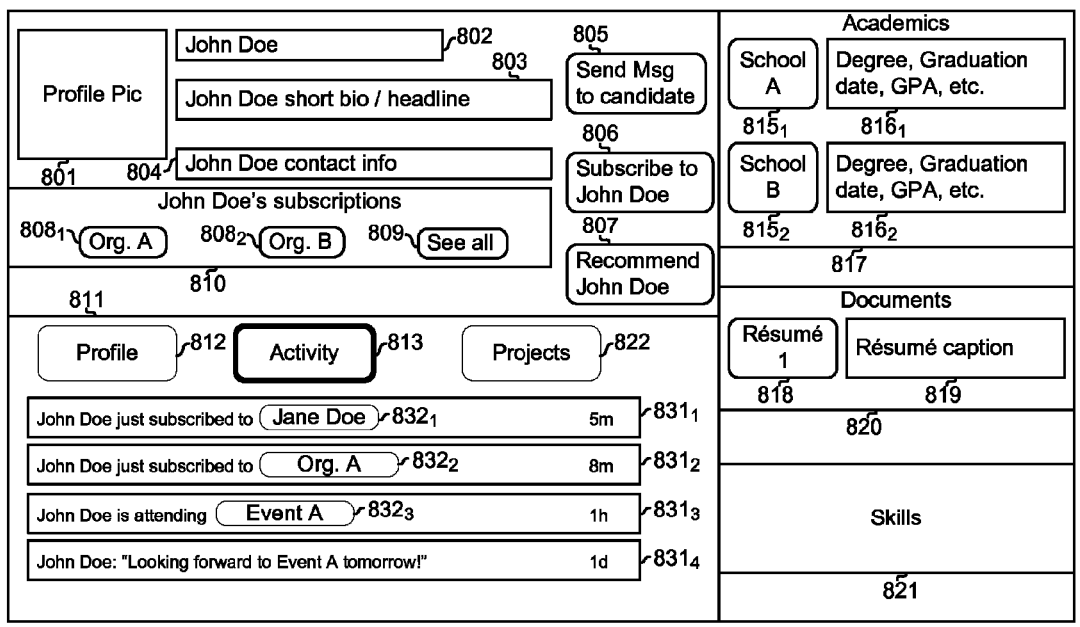
FIG. 8B depicts an example public candidate activity window provided by an electronic recruiting management system.

Now referring to FIG. 8B, when the interface element 813 is selected (as indicated by the heavy line), one or more interface elements 831 may be displayed in the candidate profile window. Each interface element $831_i$ may comprise a message or status update posted by John Doe and may indicate the day/time at which it was posted. When a message refers to an organization, candidate, or event that has a profile in the electronic recruiting system, the organization, candidate, or event name may appear as an interface element 832 that links to an associated profile.

Figure 8C:
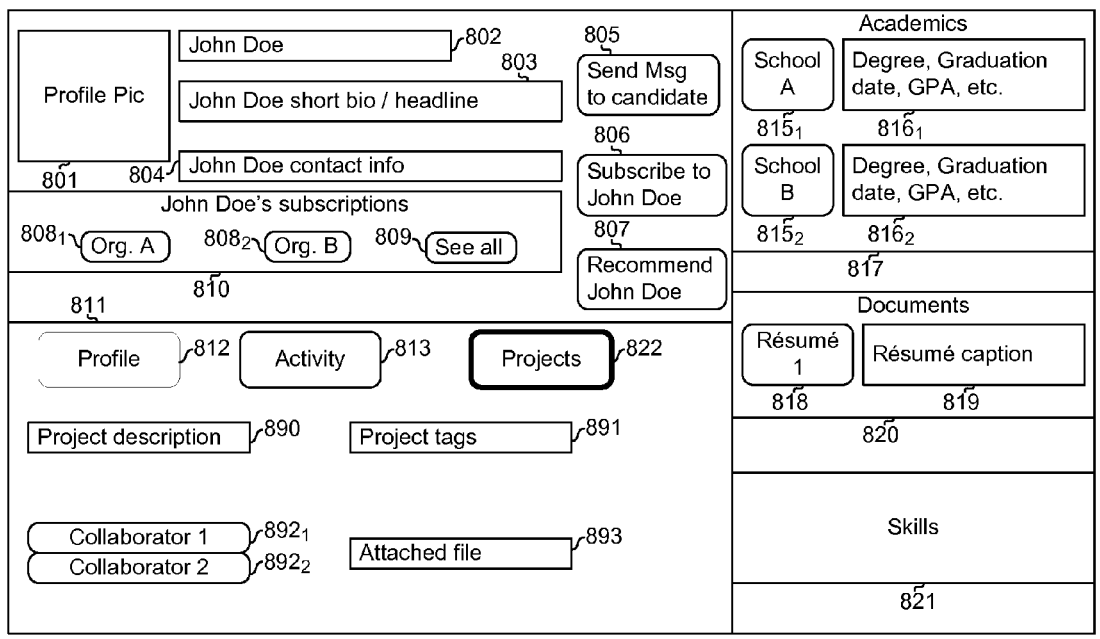
FIG. 8C depicts an example public candidate projects window provided by an electronic recruiting management system.

Now referring to FIG. 8C, when the interface element 822 is selected (as indicated by the heavy line), interface elements 890, 891, 892, and 893 may be displayed in the candidate profile. Each interface element 890 (for simplicity of illustration, only one is shown) may comprise a description (subject matter, dates, sponsors, thesis, conclusions, etc.) of a project with which the candidate has been involved. Each interface element 890 may have a corresponding interface element 891 which comprises tags (e.g., the industry to which the project is applicable, the technology used for the project, etc.) that provide quick, easily searchable information about the project. Each interface element 893 may be, or link to, a file (e.g., images, white papers, presentations, samples of code, data sets, etc.) attached to the project.

Each interface element 891 may have a corresponding one or more interface elements 892 (two are shown for illustration), each of which corresponds to another person who worked on the project. In instances when the person associated with element $892_i$ has a profile on in the electronic recruiting system, the interface element $892_i$ may link to that person's profile. In instances when the person does not have a profile in the electronic recruiting system, an invite to create a profile in the recruiting system may be sent to that person in response to the candidate listing him/her as a collaborator on the project. The invite may, for example, give the person the option of creating a profile with pre-populated information pertaining to the project. When one collaborator on a project updates information pertaining to that project, the updates may be automatically updated on the other collaborators' profiles and/or the other collaborators may be send a notification the update has been made and given the option to add the updates to their respective profiles.

Figure 8D:
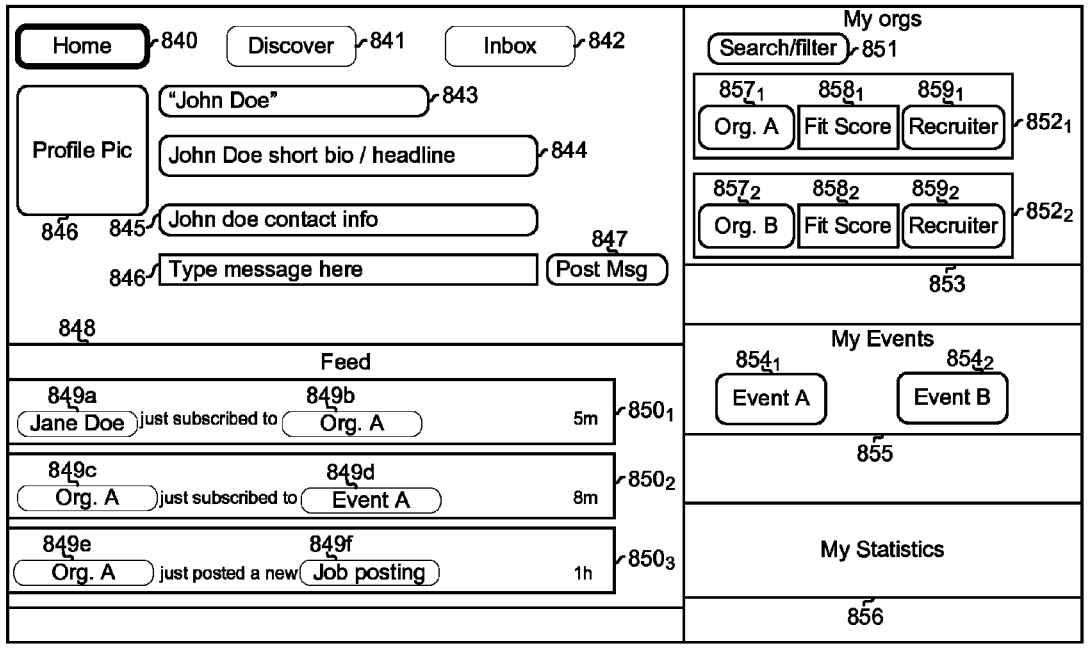
FIG. 8D depicts an example private candidate home window provided by an electronic recruiting management system.

FIG. 8D depicts an example private candidate home window provided by an electronic recruiting management system. FIG. 8D displays an example window via which a candidate (in this case John Doe) may maintain his/her profile (e.g., as shown in FIGS. 8A and 8B) and also interact with the electronic recruiting system to perform various recruiting-related processes described herein. The interface elements 840, 841, and 842 may be used for navigating between the window shown in FIG. 8D, the window shown in FIG. 8E, and a messaging window.

Still referring to FIG. 8D, the profile picture displayed in the profile window of FIGS. 8A and 8B may be changed via interaction with interface element 846. The name displayed in the profile window of FIGS. 8A and 8B may be changed via interaction with interface element 843. The headline/brief description displayed in the profile window of FIGS. 8A and 8B may be changed via interaction with the interface element 844. The contact information displayed in the profile window of FIGS. 8A and 8B may be changed via interaction with interface element 845. Interaction with the interface elements 846 and subsequent clicking or tapping of the interface element 847, an interface element 831 containing the message may be posted to the profile window shown in FIG. 8B.

The interface element 853 may comprise a list of organizations to which John Doe is subscribed in the electronic recruiting system and/or of which John Doe is a member (whether it be as employee, volunteer, etc.). Each element $852_i$ may correspond to one such organization and may, in turn, comprise an element $857_i$ that links to the organization's profile in the recruiting system, an element $858_i$, that shows a compatibility score between John Doe and the organization, and an element $859_i$ that links to the profile of particular recruiter at organization with whom John Doe has interacted. The list may be filtered and/or sorted based on any number and/or variety of criteria using the interface element 851.

The interface element 855 comprises a list of events that John Doe is subscribed to in the recruiting system and/or has attended or is planning to attend. Each event in the list may correspond to an element 854 which may link to the event's profile and/or an event organizer's profile. The interface element 856 may comprise statistics regarding John Doe's profile such as number of profile views, time since last profile view, number of organizations, candidates, and/or events subscribed-to, number of organizations, candidates, and/or events that are subscribed to John Doe's profile, etc.

The interface element 848 may comprise a feed of messages from organizations, candidates, and/or events to which John Doe is subscribed. Each interface element $850_i$ may comprise a message or status update posted by an organization, candidate, or event and may indicate the day/time at which it was posted. When a message refers to an organization, candidate, or event that has a profile in the electronic recruiting system, the organization, candidate, or event name may appear as an interface element 849 that links to an associated profile.

Figure 8E:
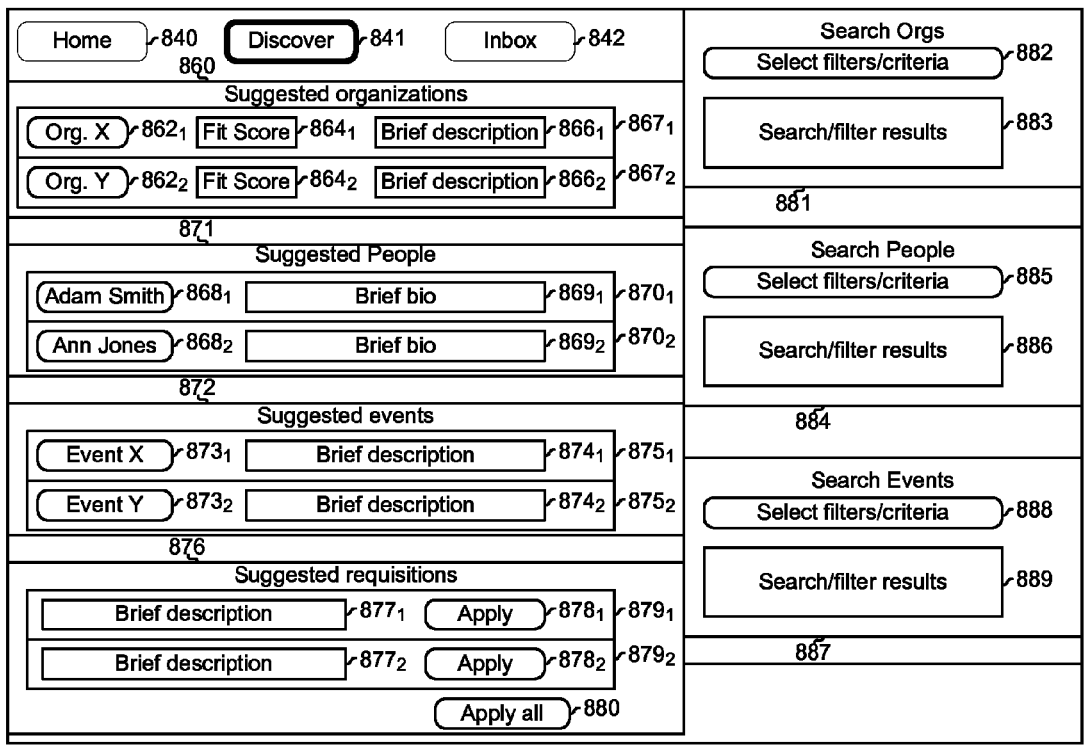
FIG. 8E depicts an example private candidate discover window provided by an electronic recruiting management system.

Now referring to FIG. 8E, the interface element 881 may provide a search tool for searching to discover organization profiles that meet selected criteria (e.g., a threshold compatibility score). Search/filter criteria may be entered via the interface element 882 and the results may be displayed in the interface element 883. The interface element 884 may provide a search tool for searching to discover candidate and/or recruiter profiles that meet selected criteria (e.g., a threshold compatibility score). Search/filter criteria may be entered via the interface element 885 and the results may be displayed in the interface element 886. The interface element 887 may provide a search tool for searching to discover event profiles meeting selected criteria (e.g., a threshold compatibility score). Search/filter criteria may be entered via the interface element 882 and the results may be displayed in the interface element 889.

The interface element 860 may comprise a list of organizations to which it is suggested that John Doe subscribe. The suggestions may be generated based on, for example, analysis by the recruiting system of: John Doe's profile, profiles to which John Doe is subscribed, the organizations' profiles, profiles to which the organizations are subscribed, scores indicating compatibility between John Doe and the organizations, John Doe's past interactions, John Doe's scheduled interactions, and/or information in John Doe's documents. Each interface element $867_i$ may correspond to one of the suggested organizations and may, in turn, comprise: an interface element $862_i$ that links to the organization's profile, an interface element $864_i$ that shows a fit score (e.g., based on a workplace culture questionnaire) between John Doe and the organization, and an interface element $866_i$ that gives a brief description of the organization.

The interface element 871 may comprise a list of people (e.g., candidates and/or recruiters) to which it is suggested that John Doe subscribe. The suggestions may be generated based on, for example, an analysis by the recruiting system of: John Doe's profile, profiles to which John Doe is subscribed, the peoples' profiles, profiles to which the people are subscribed, scores indicating compatibility between John Doe and the people, John Doe's past interactions, John Doe's scheduled interactions, the peoples' past interactions, the peoples' scheduled interactions, and/or information in John Doe's documents. Each interface element $870_i$ may correspond to one of the suggested persons and may, in turn, comprise: an interface element $868_i$ that links to the person's profile, and an interface element $869_i$ that gives a brief description of the person.

The interface element 872 may comprise a list of events (e.g., job fairs, diversity fairs, association fairs, expositions, etc.) that are suggested for John Doe to attend and/or subscribe. The suggestions may be generated based on, for example, an analysis by the recruiting system of: John Doe's profile, profiles to which John Doe is subscribed, the events' profiles, profiles to which the events' profiles are subscribed, organizations attending the events, people attending the events, scores indicating compatibility between John Doe and the events, John Doe's past interactions, John Doe's scheduled interactions, and/or information in John Doe's documents. Each interface element $875_i$ may correspond to one of the suggested events and may, in turn, comprise: an interface element $873_i$ that links to the event's profile, and an interface element $874_i$ that gives a brief description of the event.

The interface element 876 may comprise a list of requisitions (e.g., job openings, elected positions, etc.) to which it is suggested that John Doe apply. The requisitions may be stored in the server(s) 114 which may functions as the organizations' applicant tracking systems and/or which may import the requisitions from organizations' applicant tracking systems and/or other sources on the Internet. The suggestions may be generated based on, for example, an analysis by the recruiting system of: John Doe's profile, the events' profiles, subscriptions associated with the events' profiles, organizations attending the events, people attending the events, scores indicating compatibility between John Doe and the events, John Doe's past interactions, John Doe's scheduled interactions, and/or information in John Doe's documents. Each interface element $879_i$ may correspond to one of the suggested requisitions and may, in turn, comprise: an interface element $877_i$ that gives a brief description of the requisition and/or links to the requisition (e.g., on the associated organizations profile), and an interface element $878_i$ via which John Doe can submit an application for the requisition. For example, upon clicking or tapping the interface element 878, John Doe's résumé/CV and/or other information from John Doe's profile in the electronic recruiting system may be electronically submitted to the organization associated with the requisition. The interface element 880 may enable John Doe to apply for multiple requisitions, possibly associated with multiple organizations, in a single interaction (e.g., click or tap). For example, an organization may associate requisite fields of information with a particular requisition and, in response to a candidate clicking to apply to that requisition, those fields of information may be pulled from the candidate's profile, formatted as configured by the organization, and submitted to the organizations applicant tracking system.

Any of the windows described with reference to FIGS. 8A-8E may, for example, be populated by pulling the underlying information from the database(s) 124 via an API and/or other interface. Any of the windows described with reference to FIGS. 8A-8E may, for example, be viewed on a candidate terminal 102, a recruiter terminal 128, or any other suitable computing device.

Figure 9A:
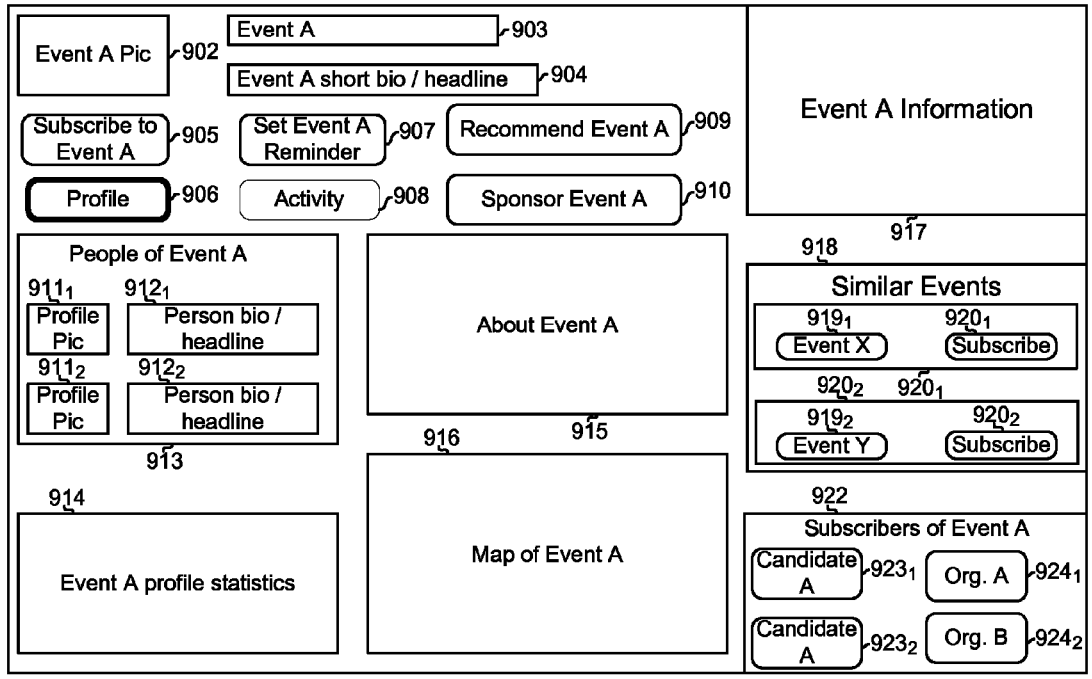
FIG. 9A depicts an example public event profile window provided by an electronic recruiting management system to a third party.

FIG. 9A depicts an example public event profile window provided by an electronic recruiting management system. Shown is an event profile window of Event A. The profile picture interface element 902 comprises a picture that an administrator of the event profile selected for others to see when viewing Event A's profile. The interface element 902 may comprise the name that Event A has chosen for others to see when viewing the profile. The interface element 904 comprises a brief description or headline that the administrator of Event A's profile has typed in for others to see when viewing the profile.

When a user interacts with the interface element 905, the user's profile may be subscribed to Event A's profile. When a user interacts with the interface element 907, Event A may be added to the user's calendar and/or a reminder for Event A may be set in a list of reminders in the user's profile. Interacting with the interface element 909 may bring up a messaging window for recommending Event A to one or more other persons and/or organizations. Interacting with the interface element 910 may bring up a window via which the user can sponsor Event A (e.g., make a donation, display that user is a sponsor of Event A on Event A's profile and/or on another website, and/or advertise Event A on the user's profile and/or on another website).

The interface element 917 may comprise information about Event A such as, for example, a date of Event A, location of Event A, information about organizations registered to attend, information about candidates registered to attend, information about requisitions that will be interviewed, industries in which Event A attendees are involved, and information about past occurrences of Event A. The information in the interface element 917 may be populated from a standard set of tags, for example. The interface element 918 may comprise a list of events similar (e.g., in any of the information in element $917_i$ in candidates and/or organizations that are subscribed, etc.) to Event A. Each interface element $920_i$ may correspond to a similar event and may, in turn, comprise an interface element $919_i$ that links to the similar event's profile and an interface element $920_i$ that, when interacted with, subscribes the user to the similar event. The interface element 922 may comprise a list of other persons, organizations, and/or events whose profiles are subscribed to Event A; each interface element $923_i$, may correspond to one such candidate and each interface element $924_i$, may correspond to one such organization.

The interface element 915 may comprise a long-form description of Event A. The interface element 916 may comprise a map of Event A. The map may be a street map and/or an indoor map of Event A. The interface element 913 may comprise a list of people (e.g., administrators, coordinators, etc.) of Event A. For each person in interface element 913 there may be an interface element $911_i$ that links to his/her profile in the electronic recruiting system and/or an interface element $912_i$ that provides a headline or brief bio of the person. The interface element 914 may comprise statistics regarding Event A's profile such as number of profile views, time since last profile view, number of organizations, candidates, and/or events subscribed-to, number of organizations, candidates, and/or events that are subscribed to John Doe's profile, etc.

When the interface element 906 is selected (as indicated by the heavy line in FIG. 9A) the window of FIG. 9A is displayed. When the interface element 908 is selected (as indicated by the heavy line in FIG. 9B), the window of FIG. 9B is displayed.

Figure 9B:
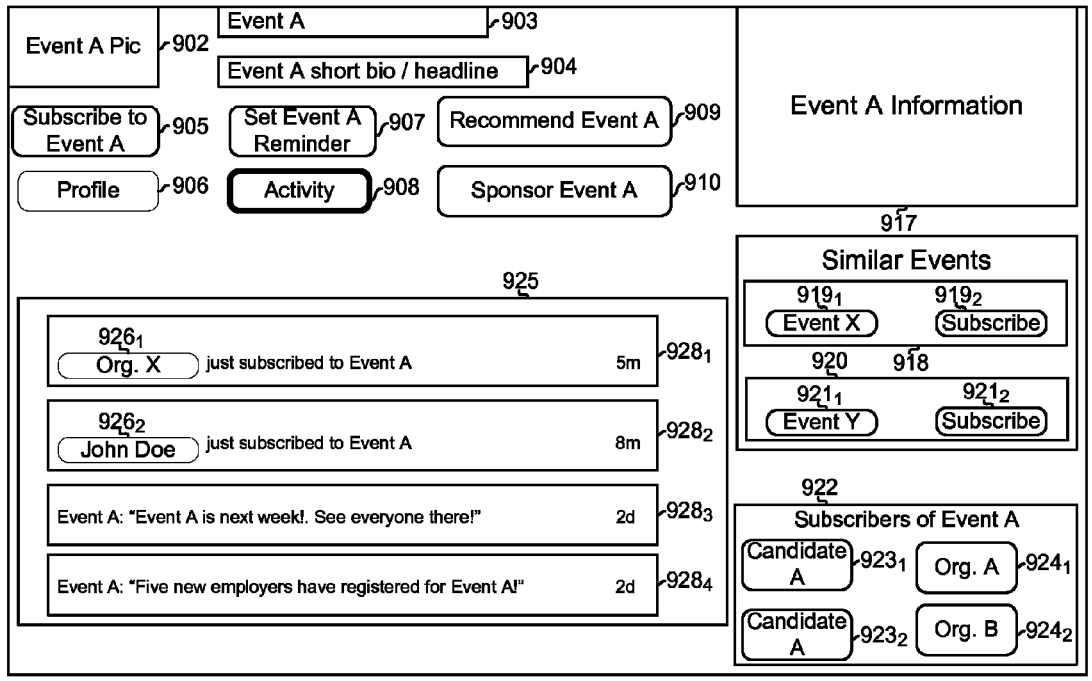
FIG. 9B depicts an example public event activity window provided by an electronic recruiting management system to a third party.

Now referring to FIG. 9B, the interface element 925 may comprise a feed of messages from organizations, candidates, and/or events to which John Doe is subscribed. Each interface element $928_i$ may comprise a message or status update posted by an organization, candidate, or event and may indicate the day/time at which it was posted. When a message refers to an organization, candidate, or event that has a profile in the electronic recruiting system, the organization, candidate, or event name may appear as an interface element 926 that links to an associated profile.

Information elements of the event profile may be accessible (e.g., via an API) such that they may be reflected on an organization's profile in the electronic recruiting system and/or on an organization's website (e.g., on Organization A's recruiting homepage at www.organizationA.com/recruiting).

Figure 9C:
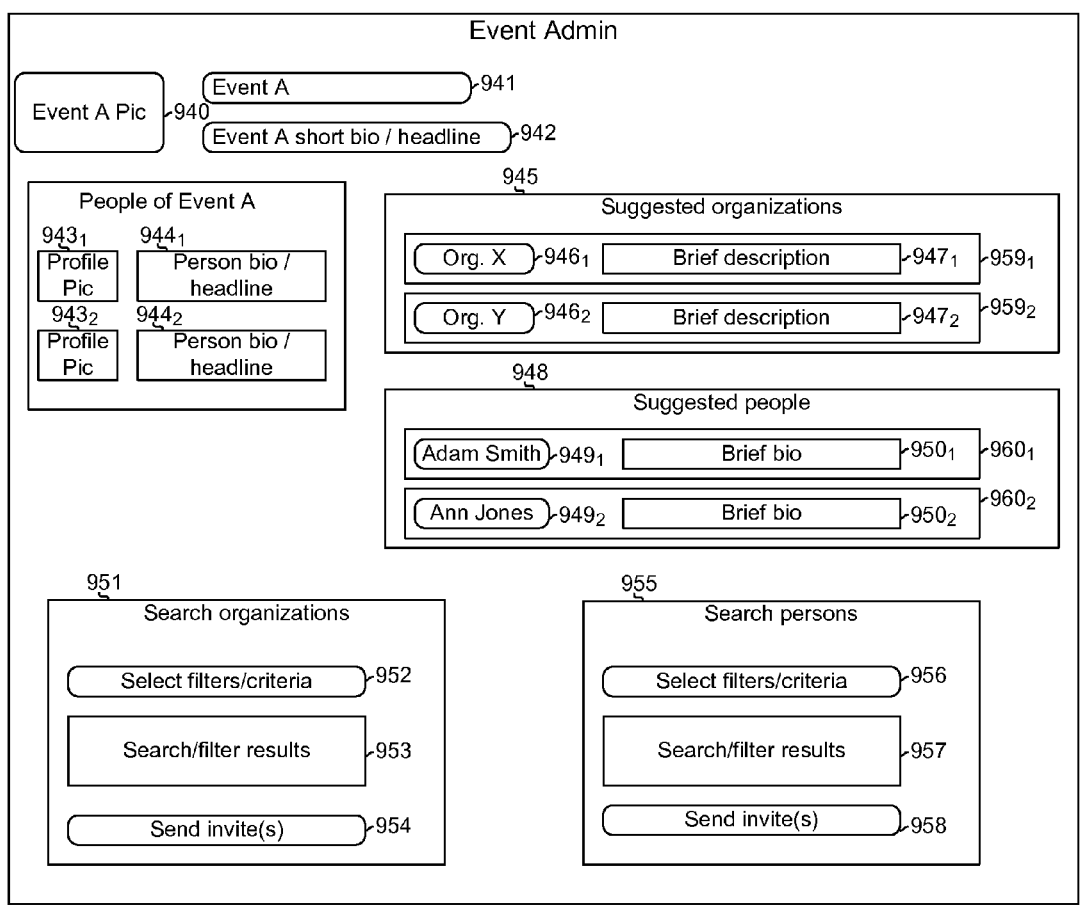
FIG. 9C depicts an example event private profile administration window provided by an electronic recruiting management system.

FIG. 9C depicts an example event private profile administration window provided by an electronic recruiting management system. FIG. 9C displays an example window via which an event organizer/administrator (in this case the administrator of Event A's profile) may maintain Event A's profile (e.g., as shown in FIGS. 9A and 9B) and also interact with the electronic recruiting system to perform various recruiting-related processes described herein. The profile picture displayed in the profile window of FIGS. 9A and 9B may be changed via interaction with interface element 940. The name displayed in the profile window of FIGS. 9A and 9B may be changed via interaction with interface element 941. The headline/brief description displayed in the profile window of FIGS. 9A and 9B may be changed via interaction with the interface element 942. The people and corresponding descriptions shown in the interface element 913 of FIG. 9A may be changed via interaction with interface elements 943 and 944.

The interface element 945 may comprise a list of organizations that are suggested for the administrator of Event A to invite to attend Event A. The suggestions may be generated based on, for example, analysis by the recruiting system of: Event A's profile, the organizations' profiles, subscriptions associated with the organizations' profiles, past attendance of Event A, candidates registered to attend Event A, and/or organizations registered to attend Event A. Each interface element 959$_i$ may correspond to one of the suggested organizations and may, in turn, comprise: an interface element 946$_i$ that links to the organization's profile, an interface element 947$_i$ that gives a brief description of the organization.

The interface element 948 may comprise a list of people (e.g., candidates and/or recruiters) that are suggested to be invited to Event A. The suggestions may be generated based on, for example, an analysis by the recruiting system of: Event A's profile, the peoples' profiles, subscriptions associated with the people's profiles, scores indicating compatibility between Event A and the people, past attendance of Event A, candidates registered to attend Event A, and/or organizations registered to attend Event A. Each interface element 870$_i$ may correspond to one of the suggested persons and may, in turn, comprise: an interface element 868$_i$ that links to the person's profile, and an interface element 869$_i$ that gives a brief description of the person.

The interface element 951 may provide a search tool for searching to discover organization profiles meeting selected criteria (e.g., in a particular location and/or industry). Search/filter criteria may be entered via the interface element 952 and the results may be displayed in the interface element 953. The interface element 954 may enable sending invitations to Event A to all (or a selected subset) organizations meeting in the interface element 953. The interface element 955 may provide a search tool for searching to discover candidate and/or recruiter profiles meeting selected criteria (e.g., in a particular location and/or industry). Search/filter criteria may be entered via the interface element 956 and the results may be displayed in the interface element 957. The interface element 958 may enable sending invitations to Event A to all (or a selected subset) organizations in the interface element 957.

Any of the windows described with reference to FIGS. 9A-9C may, for example, be populated by pulling the underlying information from the database(s) 124 via an API and/or other interface. Any of the windows described with reference to FIGS. 8A-8E may, for example, be viewed on a candidate terminal 102, a recruiter terminal 128, or any other suitable computing device.

Figure 10A:
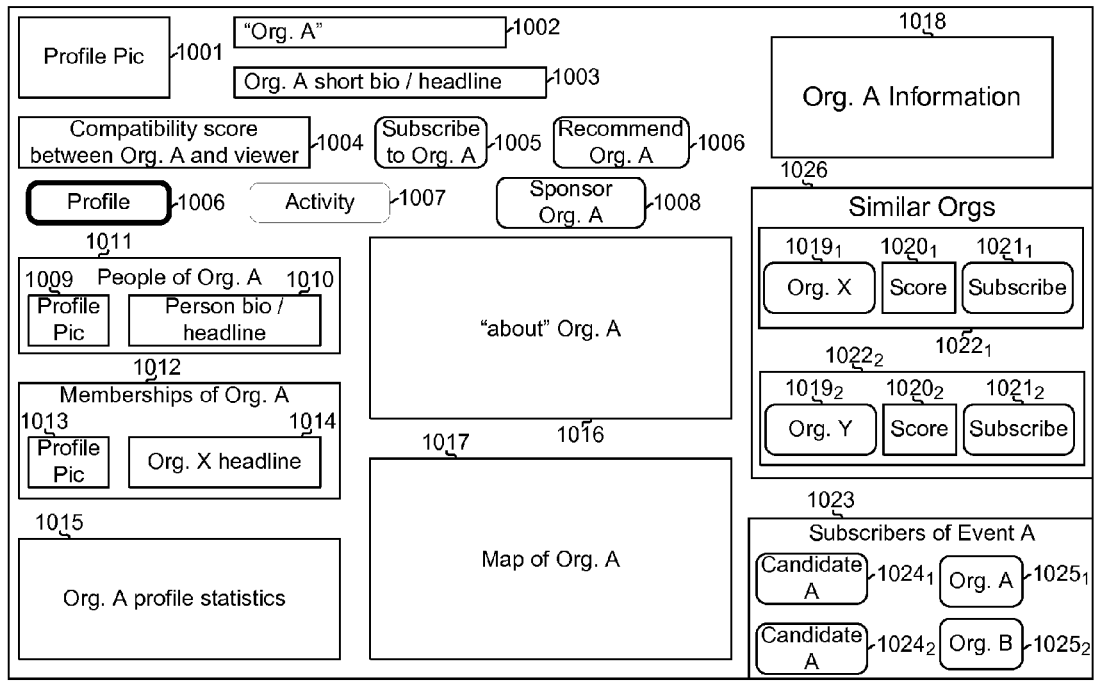
FIG. 10A depicts an example public organization profile window provided by an electronic recruiting management system.

FIG. 10A depicts an example public organization profile window provided by an electronic recruiting management system. Shown is an organization profile window of Organization A. The profile picture interface element 1001 comprises a picture that an administrator of Organization A's profile selected for others to see when viewing Organization A's profile. The interface element 1002 may comprise the name that Event A has chosen for others to see when viewing the profile. The interface element 1003 comprises a brief description or headline that the administrator of Event A's profile has typed in for others to see when viewing the profile.

The interface element 1004 may display a compatibility score (e.g., based on work culture questionnaires) between Organization A and the user viewing Organization A's profile. When a user interacts with the interface element 1005, the user's profile may be subscribed to Organization A's profile. Interacting with the interface element 1006 may bring up a messaging window for recommending Organization A to one or more other persons and/or events. Interacting with the interface element 1008 may bring up a window via which the user can sponsor Organization A (e.g., make a donation, display that user is a sponsor of Organization A on Organization A's profile, and/or on another website, and/or advertise Organization A on the user's profile and/or on another website).

The interface element 1018 may comprise information about Organization A such as, for example, a website URL, and organization demographics such as, for example, size, industry, college majors of members/employees, and/or diversity information. The information in the interface element 1018 may be populated from a standard set of tags, for example. The interface element 1026 may comprise a list of organizations similar (e.g., in any of the information in element 1018, in what candidates and/or organizations are subscribed to the organization, in what candidates and/or organizations the organization is subscribed to, etc.) to Organization A. Each interface element 1022$_i$ may correspond to a similar organization and may, in turn, comprise an interface element 1019$_i$ that links to the similar organization's profile, an interface element 1020$_i$ that shows a compatibility score between John Doe and the organization, and an interface element 1021$_i$ that, when interacted with, subscribes the user to the similar organization. The interface element 1023 comprises a list of other persons, organizations, and/or events whose profiles are subscribed to Organization A; each interface element 1024$_i$ may correspond to one such candidate and each interface element 1025$_i$ may correspond to one such organization.

The interface element 1016 may comprise a long-form description of Organization A. The interface element 1017 may comprise a map of Organization A's location(s). The interface element 1011 may comprise list of people (e.g., administrators, Recruiters, etc.) of Organization A. For each person in interface element 1011, there is an interface element 1009 that links to his/her profile in the electronic recruiting system and/or an interface element 1010 that provides a headline or brief bio of the person. The interface element 1012 may comprise list of other organizations (e.g., non-profits) of which Organization A is a member. The interface element 1015 may comprise statistics regarding Organization A's profile such as number of profile views, time since last profile view, number of organizations, candidates, and/or events subscribed-to, number of organizations, candidates, and/or events that are subscribed to Organization A's profile, etc.

When the interface element 1006 is selected (as indicated by the heavy line in FIG. 10A) the window of FIG. 10A is displayed. When the interface element 1007 is selected (as indicated by the heavy line in FIG. 10B), the window of FIG. 9B is displayed.

Figure 10B:
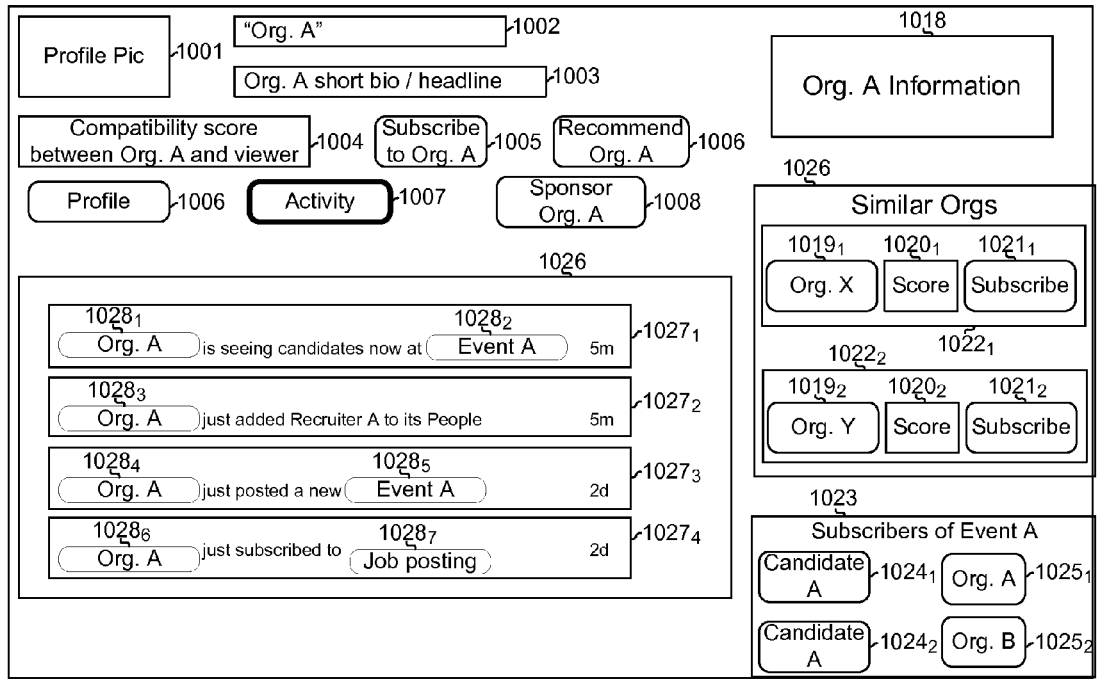
FIG. 10B depicts an example public organization activity window provided by an electronic recruiting management system.

Now referring to FIG. 10B, the interface element 1026 may comprise a feed of messages from organizations, candidates, and/or events to which Organization A is subscribed. Each interface element $1027_i$ may comprise a message or status update posted by an organization, candidate, or event and may indicate the day/time at which it was posted. When a message refers to an organization, candidate, or event that has a profile in the electronic recruiting system, the organization, candidate, or event name may appear as an interface element 1028 that links to an associated profile.

Figure 10C:
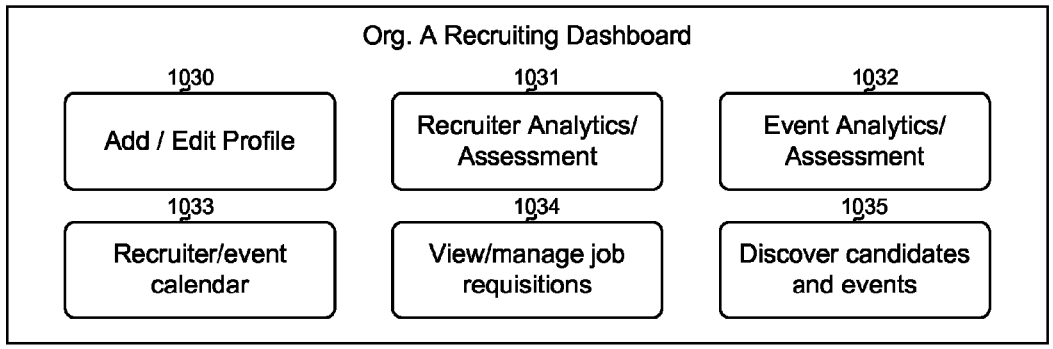
FIG. 10C depicts an example recruiting dashboard window provided by an electronic recruiting management system.

FIG. 10C depicts an example recruiting dashboard window provided by an electronic recruiting management system. The recruiting dashboard window may provide an interface for managing the content, layout, etc., of the profile windows of FIGS. 10A and 10B and for managing recruiting processes. The recruiting dashboard window of FIG. 10C may typically be used by an organization's human resources and/or recruiting coordinator, for example. Interacting with the interface element 1030 may bring up a window for editing the profile displayed in FIGS. 10A and 10B. Such a window may be similar to the windows shown in FIGS. 8D and 9C. That is, such a window may comprise various interface elements for editing corresponding interface elements of the profile windows in FIGS. 10A and 10B.

Figure 10D:
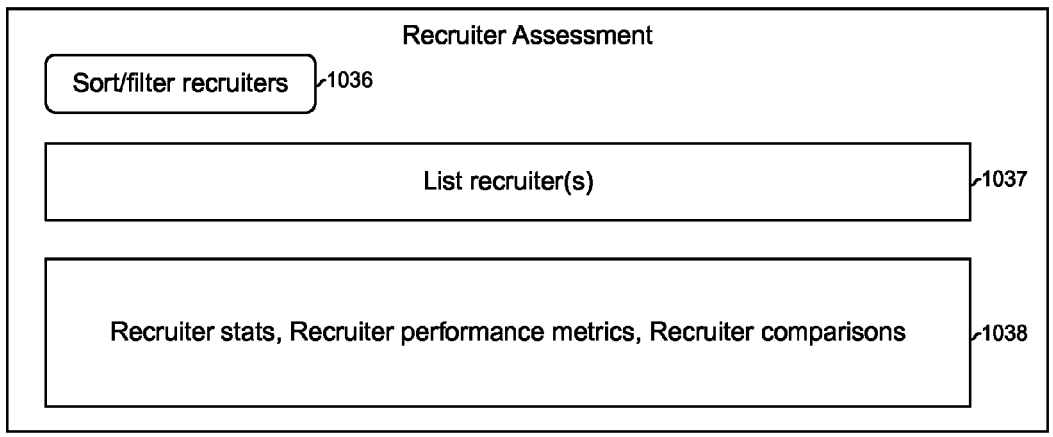
FIG. 10D depicts an example recruiter assessment window provided by an electronic recruiting management system.
Figure 10E:
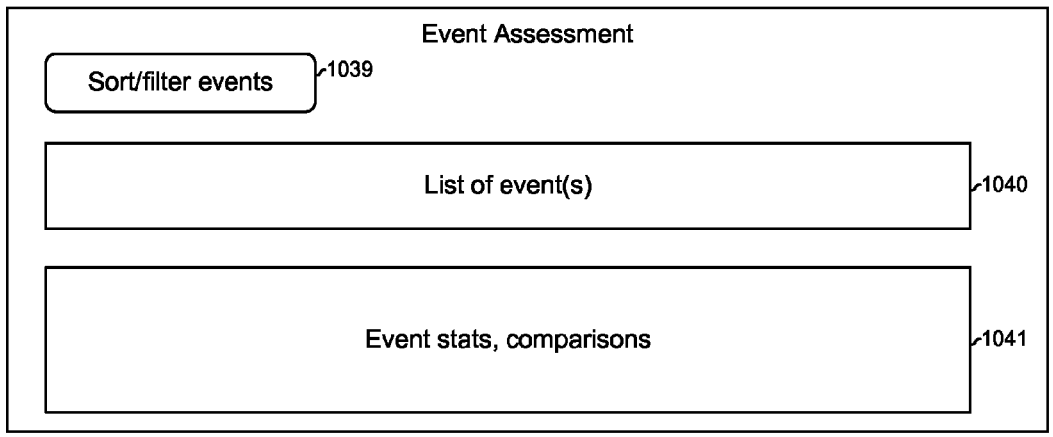
FIG. 10E depicts an example event assessment window provided by an electronic recruiting management system.
Figure 10F:
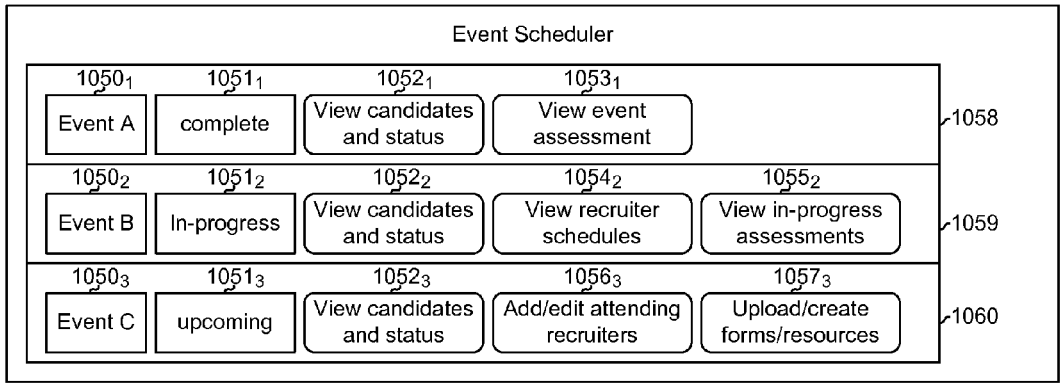
FIG. 10F depicts an example event scheduler window provided by an electronic recruiting management system.
Figure 10G:
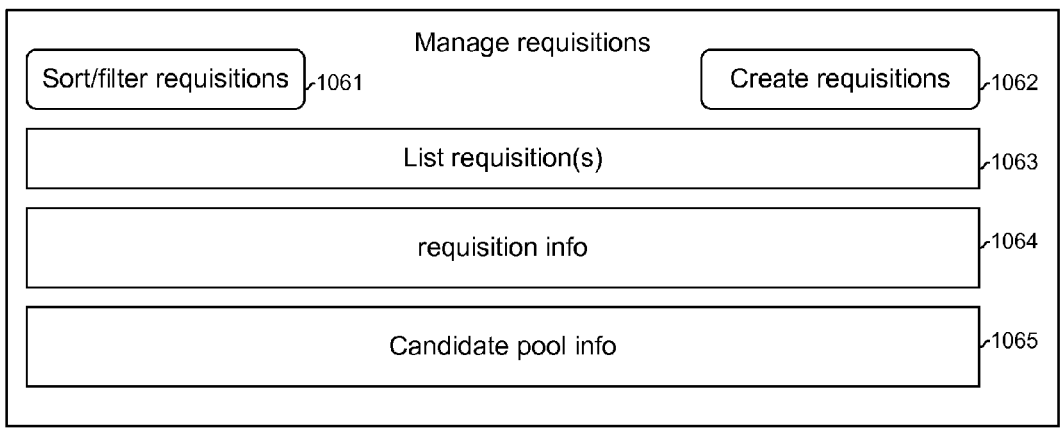
FIG. 10G depicts an example requisition management window provided by an electronic recruiting management system.

Interacting with the interface element 1031 may bring up a window for assessing recruiter performance according to various metrics. An example of such a window is shown in FIG. 10D. Interacting with the interface element 1032 may bring up a window for assessing various metrics associated with the organization's attendance and/or activity at one or more recruiting events. An example of such a window is shown in FIG. 10E. Interacting with the interface element 1033 may bring up a window for managing an organization recruiting calendar. An example of such a window is shown in FIG. 10F. Interacting with the interface element 1034 may bring up a window for managing an organization's position/job requisitions. An example of such a window is shown in FIG. 10G. Interacting with the interface element 1035 may bring up a window for performing a search to discover candidates and/or events that might be suitable for organization. An example of such a window is shown in FIG. 10I.

FIG. 10D depicts an example recruiter assessment window provided by an electronic recruiting management system. Interaction with the interface element 1036 may enable selecting, filtering, and/or sorting the organization's recruiters to generate the list of recruiters being assessed in interface element 1037. The interface element 1038 may then display statistics and/or recruiting performance metrics for the recruiters listed in interface element 1037.

The sorting/filtering of the list via interface element 1036 may be based on any one or more of the metrics or statistics shown in interface element 1038. For a particular recruiter ("Recruiter") of a particular organization ("Organization"), such metrics and/or statistics may include, for example: number of events attended by Recruiter, list of particular events attended by Recruiter, number of candidates screened by Recruiter, list of particular candidates screened by Recruiter, number of offers presented to candidates identified by Recruiter, number of candidates identified by Recruiter that are ongoing in the interview process, number of offers accepted/rejected by candidates identified by Recruiter, number of candidates identified by Recruiter that were ultimately awarded a position with Organization, subsequent performance of such hires (e.g., based on internal performance reviews), statistics regarding Recruiter's profile in the electronic recruiting system, and/or assessment scores that Recruiter has given to candidates generally and/or to particular candidates. The interface element 1038 may present the information in the form of, for example, lists, graphs, charts, etc. The information presented in interface element 1038 may also be presented such that recruiter(s) can, for example, be compared side-by-side with other recruiters and/or year-over-year performance.

FIG. 10E depicts an example event assessment window provided by an electronic recruiting management system. Interaction with the interface element 1039 may enable selecting, filtering, and/or sorting the events to generate the list of events being assessed in interface element 1040. The interface element 1041 may then display statistics and/or recruiting performance metrics for the events listed in interface element 1040.

The sorting/filtering of the list via interface element 1039 may be based on any one or more of the metrics or statistics shown in interface element 1041. For a recruiting coordinator of a particular organization ("Organization") viewing the interface element 1041, such metrics and/or statistics may include, for example: Organization's costs in participating in the event(s), number of candidates (perhaps meeting particular, selected criteria) that attended the event(s), number candidates screened by Organization's recruiters at the event(s), number of Organization positions filled by candidates identified at the event(s), subsequent performance (e.g., based on internal performance reviews) of such candidates, list of candidates identified (e.g., screened and recommended for interviewing) at the event(s), averages assessment scores given by Organization's recruiters to candidate screened at the event(s), average compatibility scores of candidates who attended the event(s), number of referrals originated at the event(s), statistics regarding the number and/or rates at which candidate terminals were scanned by recruiter terminals and/or check-in terminals at the event(s). The interface element 1041 may present the information in the form of, for example, lists, graphs, charts, etc. The information presented in interface element 1041 may also be presented such that events can be compared side-by-side and/or year-over-year.

FIG. 10F depicts an example event scheduler window provided by an electronic recruiting management system. Interface elements 1058, 1059, and 1060 may be displayed on a calendar and/or in a chronological list. Each element 1058 may correspond to a past event. Each element 1059 may correspond to an in-progress event. Each element 1060 may correspond to a future event.

Each interface element $1058_i$ may provide the name of the associated event and may, when interacted with, bring up the associated event's profile in the electronic recruiting system. Each interface element $1051_i$ may indicate a status of the corresponding event. Each interface element $1052_i$ may, when interacted with, bring up a list of candidates who attended and/or are registered to attend the associated event and may indicate a status of each candidate (e.g., whether the candidate was screened at a past event, individual and/or composite assessment scores the candidate received at the past event, whether the candidate is scheduled for further interviewing, whether the candidates are high priority to be screened at a future event, a time at which the candidate is to be screened at a future event, etc.). Each interface element $1053_i$ when interacted with, may bring up a window in which assessments (e.g., submitted by recruiters via interface element 304 of window 300 in FIG. 3A) of the associated event may be reviewed and analyzed. Each interface element $1054_i$ when interacted with, may bring up a window (e.g., with a calendar element) that displays the schedules of recruiters and/or interviewers attending an in-progress event. Each interface element $1056_i$, when interacted with, may bring up a window (e.g., with a calendar element and list of recruiters and interviewers) via which the recruiting coordinator can schedule recruiters and/or interviewers for the upcoming event. Each interface element $1057i$ may, when interacted with, bring up a window for creating and/or uploading forms (e.g., assessment forms described with reference to FIGS. 4B-4D.) and/or other resources such as, for example, the resources described with reference to FIGS. 2A and 2B.

Each interface element $1055_i$ may bring up a window via which the recruiting coordinator or human resources manager can view (e.g., in real-time and/or in periodic updates) recently-completed and in-progress assessment forms being filled out by recruiters and/or interviewers attending the in-progress event. In this manner, a recruiting manager or recruiting coordinator can, at or near real-time, track the progress and/or value of particular recruiting events and/or recruiters in real-time, can allocate and de-allocate resources to a particular event depending on current need, manage recruiter and/or interviewer schedules (e.g., to accommodate high-priority candidates), identify the particularly strong candidates as soon as possible, etc.

FIG. 10G depicts an example requisition management window provided by an electronic recruiting management system. The interface element 1061 may enable selection of criteria for filtering and/or sorting a list of requisitions shown in the interface element. The requisitions may be sorted by, for example, any of the information shown in interface element 1064. Such information may include, for example, requirements and/or qualifications for the position, salary to be paid for the position, geographic location of the position, etc. The interface element 1065 may comprise information about the pool of candidates from which the requisition may be filled. Information about the pool of candidates may include, for example, number of candidates in the electronic recruiting system that meet the qualifications/requirements of the requisition, number of candidates already screened and/or interviewed for the requisition, number of candidates scheduled to be interviewed for the requisition, where the candidates in the pool where identified (e.g., via their online profiles, via paper résumé/CV, via a particular event, via an external website or recruiting server, etc.), recruiter(s) associated with particular candidates in the pool, links to profiles of candidates in the pool, assessment scores of candidates in the pool, feedback regarding the organization received from candidates in the pool, etc.

Figure 10H:
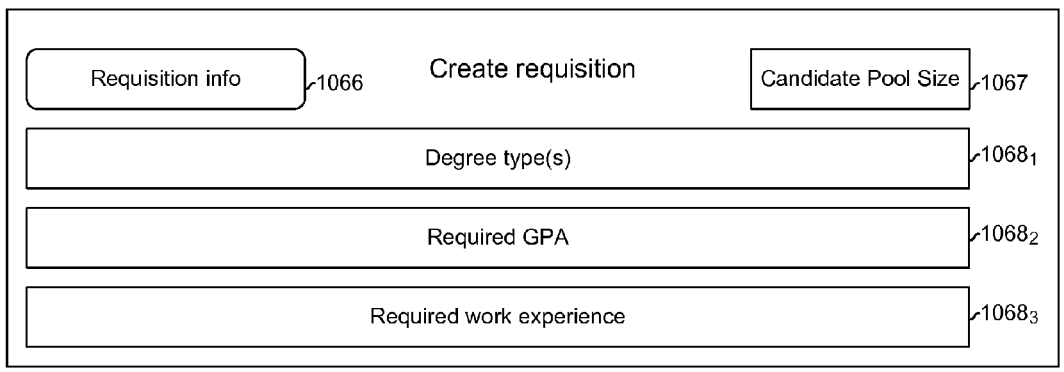
FIG. 10H depicts an example requisition creation window provided by an electronic recruiting management system.
Figure 10I:
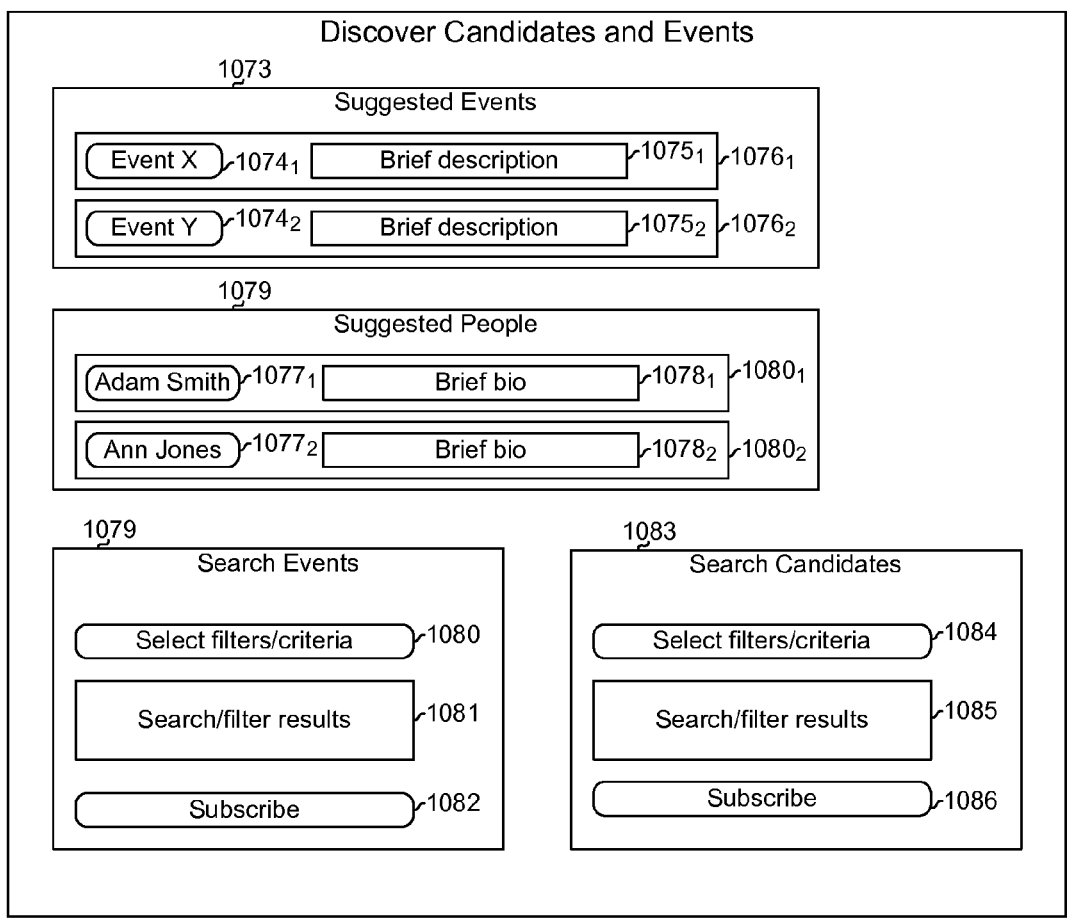
FIG. 10I depicts an example candidate and event discovery window provided by an electronic recruiting management system.

FIG. 10H depicts an example requisition creation window provided by an electronic recruiting management system. Interaction with the interface element 1066 may provide for entering information, (e.g., title, location, salary, etc.) about the requisition to be created. Interaction with each of the interface elements $1068_i$ may provide for entering qualifications/requirements of the requisition being created. The interface element 1067 may display a size of the candidate pool for the requisition being created. The interface element 1067 may be updated in real-time as the requirements for the position are input via the interface elements 1068 and as new candidates are input to the electronic recruiting system. The candidate pool size information in interface element 1067 may be used in determining the qualifications for the position as described, for example, with reference to FIGS. 11A and 11B.

FIG. 10I depicts an example candidate and event discovery window provided by an electronic recruiting management system. For ease and clarity of description, it is assumed a recruiting coordinator of Organization is viewing the window of FIG. 10I. The interface element 1073 may comprise a list of events that are suggested for the Organization to attend. The suggestions may be generated based on, for example, analysis by the recruiting system of: Organization's profile, the events' profiles, subscriptions associated with the events' profiles, past events attended by Organization, candidates registered to attend the events, candidate pool size requirements of Organizations requisitions, and/or other organizations registered to attend the events. Each interface element 1076 may correspond to one of the suggested events and may, in turn, comprise: an interface element $1074_i$ that links to the event's profile, an interface element $1075_i$ that gives a brief description of the organization.

The interface element 1079 may comprise a list of people (e.g., candidates and/or recruiters) that are suggested to join Organization. The suggestions may be generated based on, for example, an analysis by the recruiting system of: Organization's profile, the peoples' profiles, profiles to which the people are subscribed, scores indicating compatibility between Organization and the people, and/or the people's résumé/CV information. Each interface element $1080_i$ may correspond to one of the suggested persons and may, in turn, comprise: an interface element $1077_i$ that links to the person's profile, and an interface element $1078_i$ that gives a brief description of the Event.

The interface element 1079 may provide a search tool for searching to discover event profiles meeting selected criteria (e.g., in a particular location and/or industry). Search/filter criteria may be entered via the interface element 1080 and the results may be displayed in the interface element 1081. The interface element 1082 may enable subscribing to and/or registering for all (or a selected subset) of the events listed in the interface element 1081. The interface element 1083 may provide a search tool for searching to discover candidate and/or recruiter profiles meeting selected criteria (e.g., in a particular location and/or industry). Search/filter criteria may be entered via the interface element 1084 and the results may be displayed in the interface element 1085. The interface element 1086 may enable subscribing to the profile(s) of all (or a selected subset) of the people listed in the interface element 1085.

Any of the windows described with reference to FIGS. 10A-10I may, for example, be populated by pulling the underlying information from the database(s) 124 via an API and/or other interface. Any of the windows described with reference to FIGS. 8A-8E may, for example, be viewed on a candidate terminal 102, a recruiter terminal 128, or any other suitable computing device.

Figure 11A:
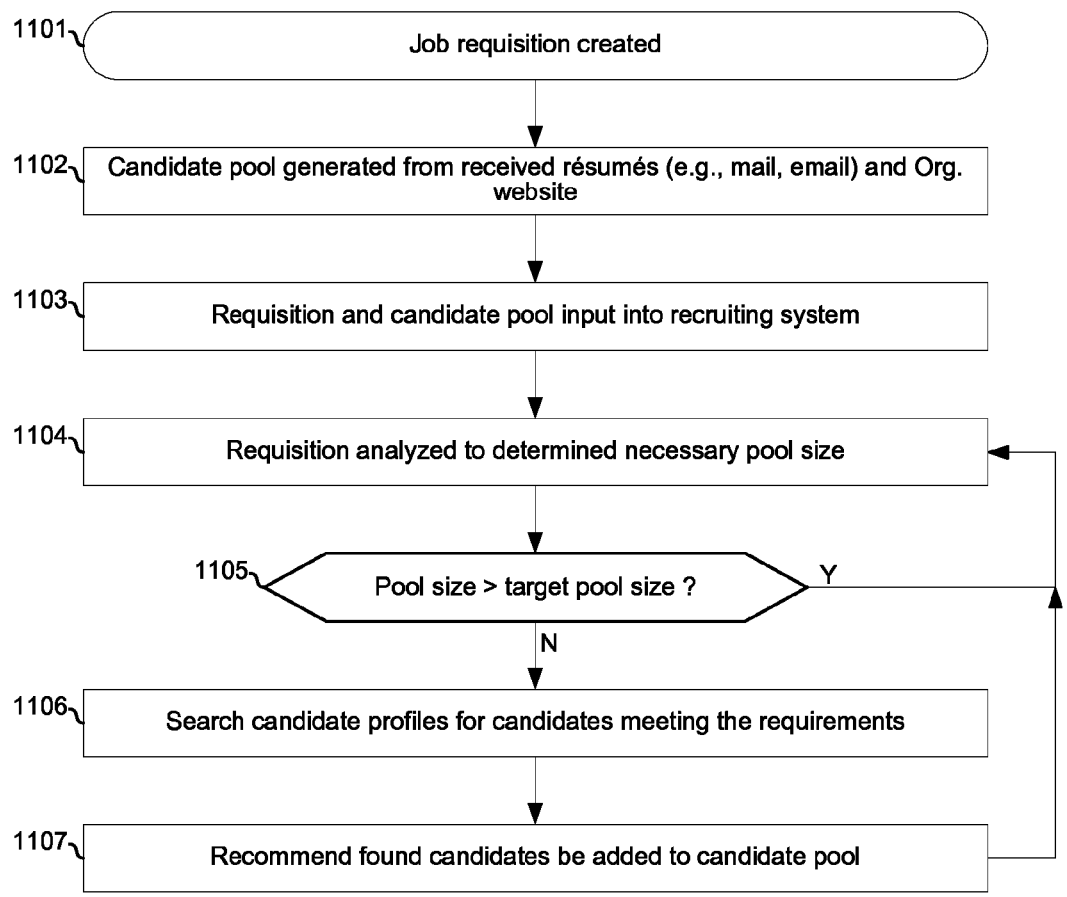
FIG. 11A depicts a flowchart illustrating an example process for candidate pool management using an electronic recruiting management system.

FIG. 11A depicts a flowchart illustrating an example process for candidate pool management using an electronic recruiting management system. The process begins with block 1101 in which a job requisition is opened by Organization. The requisition may be created apart from the electronic recruiting system. For example, a job requisition may be created and posted to the Organization's website. In block 1102 the candidate pool for the requisition may be populated apart from the electronic recruiting system. For example, candidates may submit résumés/CVs via email and postal mail, and Organization may collect those résumés/CVs and scan and/or manually enter them into Organization's applicant tracking system (ATS).

In block 1103, Organization decides to integrate their applicant tracking system with the electronic recruiting system described herein. Accordingly, the requisition and information about the existing candidate pool is transferred into the electronic recruiting system. In block 1104, the existing candidate pool and requisition are analyzed to determine a necessary size of the candidate pool in order to have a certain probability that a suitable candidate will be found and hired. This analysis may be based, for example, on recruiting and hiring information collected from Organization, other organizations, and/or the pertinent industry in general. In block 1105, if the existing candidate pool is of the necessary size, then the process returns to block 1104. In this manner, the candidate pool may be continually and/or periodically monitored such that candidates can be added when new candidates meeting requirements are input to the electronic recruiting system and such that candidates who are no longer available for the position can be removed from the pool.

Returning to block 1105, if the existing candidate pool is not of the necessary size, then the process proceeds to block 1106. In block 1106, the parameters of the requisition (e.g., salary, location, qualifications, etc.) are used to search for matching candidate profiles in the electronic recruiting system. Where such requirements result in a list of candidates that is more than is needed to fill the candidate pool to then necessary size, the list of candidates may be further pared down based on compatibility scores (e.g., based on workplace culture) between the candidates and Organization. In block 1107, the candidates discovered in the search of block 1106 are recommended for addition to the candidate pool. The administrator in charge of the requisition may be enabled to accept or reject the recommended candidates individually, in groups, and/or as a whole. After block 1107, the process returns to block 1104.

Figure 11B:
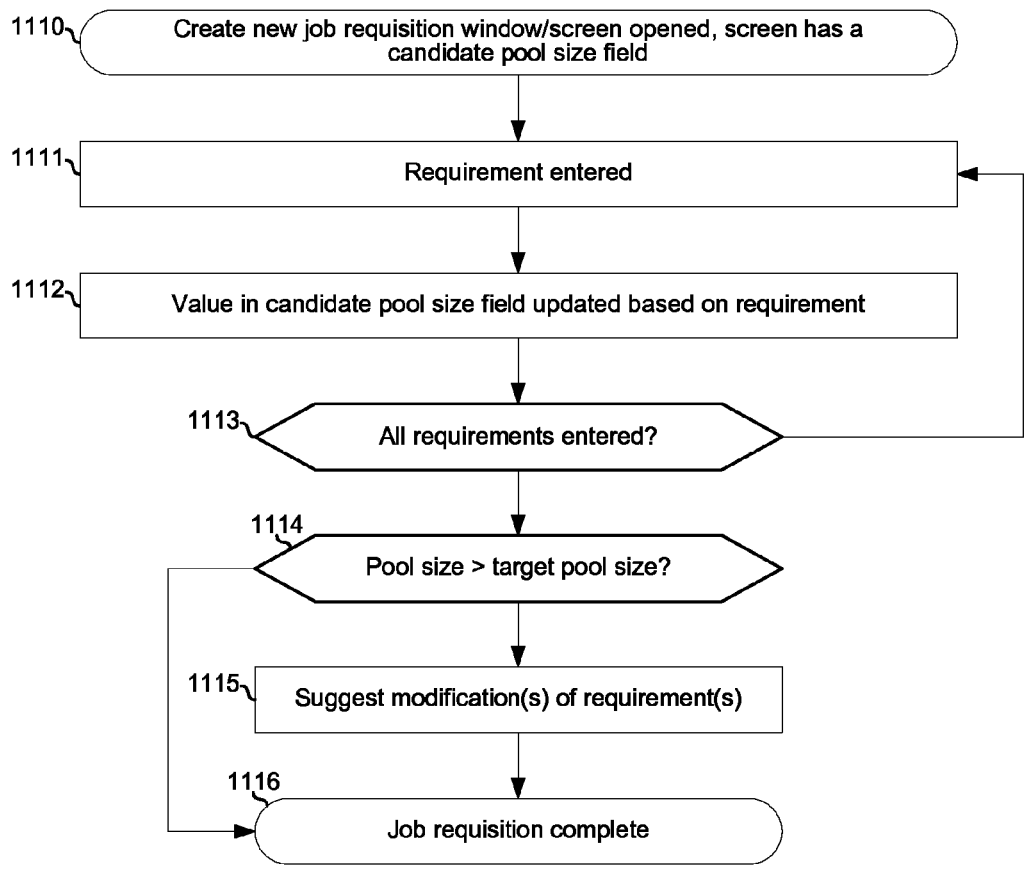
FIG. 11B depicts a flowchart illustrating an example process for creating a job requisition using an electronic recruiting management system.

FIG. 11B depicts a flowchart illustrating an example process for creating a job requisition using an electronic recruiting management system. The process begins with block 1110 in which creation of a new job requisition is started in the electronic management system via the window described above with reference to FIG. 10I. In block 1111, the user creating the requisition enters a requirement/qualification for the requisition. In block 1112, the value in the candidate pool size field is updated based on the requirement entered in block 1111. That is, if the requirement/qualification sets a relatively-high standard, the value in the candidate pool size field is likely to decrease, whereas a qualification setting a low standard may be unlikely to affect the candidate pool size.

In block 1113, it is determined whether all requirements/qualifications for the requisition have been entered. If not, the process returns to block 1111. If so, the process advances to block 1114 where it is determined whether the candidate pool size is big enough to ensure, with a desired probability, that a suitable candidate will be found. If the pool size is not big enough, then, in block 111, the electronic recruiting system analyzes the qualifications/requirements and generates suggested changes to the requirements that will get the candidate pool up to the necessary size. The user can accept one or more of the suggested changes and/or can reject them to accept the smaller candidate pool size. In block 1116, creation of the job requisition is complete.

Figure 12:
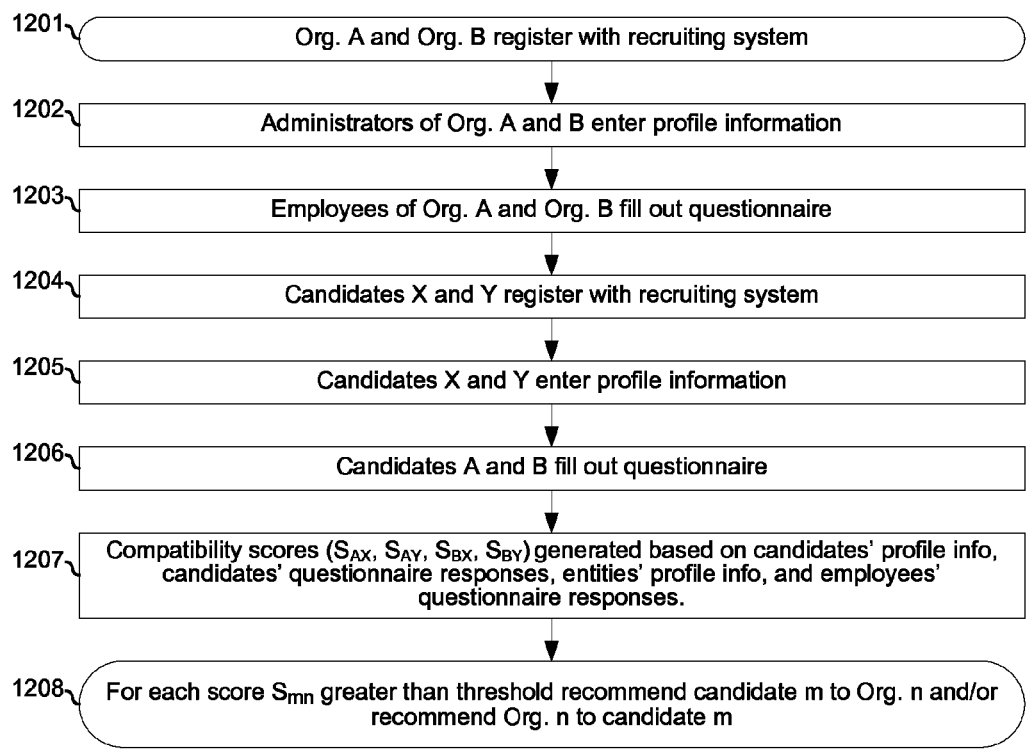
FIG. 12 depicts a flowchart illustrating an example process for matching candidate and entities via an electronic recruiting management system.

FIG. 12 depicts a flowchart illustrating an example process for matching candidate and entities via an electronic recruiting management system. For ease and clarity of description, the process of FIG. 12 is described using two candidates and two organizations. The process, however, is applicable to any number of candidates and any number of organizations. The process begins with block 1201 in which each of Organization A and Organization B register with the electronic recruiting system. In block 1202, administrators of Organization A and Organization B create their respective profiles in the electronic recruiting system (e.g., using window similar to the windows of FIGS. 8D and 9C). In block 1203, employees of Organization A and employees of Organization B fill out questionnaires regarding their personalities, preferences, and/or workplace culture.

In block 1204, Candidate X and Candidate Y register with the electronic recruiting system. In block 1205, Candidates X and Y create their respective profiles in the electronic recruiting system (e.g., using the window of FIG. 8D). In block 1206, Candidates X and Y fill out questionnaires regarding their personalities and/or workplace culture preferences. In block 1207 compatibility scores $S_{AX}$ (compatibility between A and X), $S_{AY}$ (compatibility between A and Y), $S_{BX}$ (compatibility between B and X), and $S_{BY}$ (compatibility between A and X) are generated. The compatibility scores may be generated based on Organization A's profile, Organization B's profile, Candidate X's profile, Candidate Y's profile, the questionnaire responses of Organization A's employees, the questionnaire responses of Organization B's employees, Candidate X's responses to the questionnaire, and/or Candidate Y's responses to the questionnaire.

In block 1208, for each compatibility score $S_{mn}$, that is greater than a determined threshold, the electronic recruiting system may recommend Candidate m to Organization n and/or recommend Organization n to Candidate m.

Figure 13:
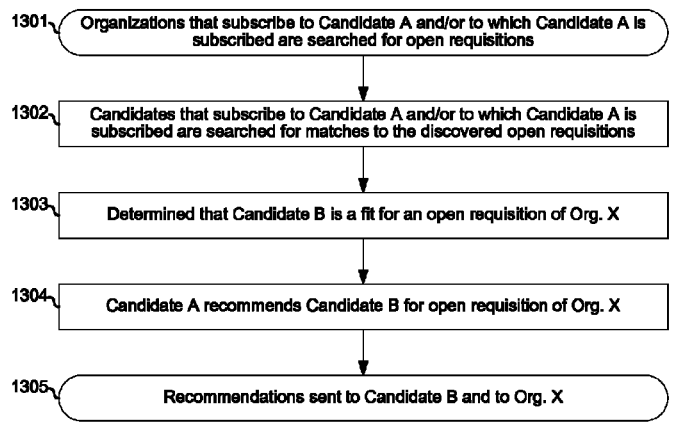
FIG. 13 depicts a flowchart illustrating an example process for candidate recommendations via an electronic recruiting management system.

FIG. 13 depicts a flowchart illustrating an example process for candidate recommendations via an electronic recruiting management system. The process begins with block 1301 in which the electronic recruiting system searches the requisitions of organizations that are subscribed to Candidate A and the requisitions of organizations to which Candidate A is subscribed. For purposes of description, it is assumed Organization X is among such organizations. In block 1302, candidates who are subscribed to Candidate A and candidates to whom Candidate A is subscribed are searched for candidates who match the requisition(s) discovered in block 1301. For purposes of description, it is assumed Candidate B is among such candidates. In block 1304, the search of block 1303 reveals that Candidate B is a good fit for an open requisition of Organization X. In block 1304, Candidate A is prompted as to whether s/he would like to recommend Candidate B for the position with Organization X. If Candidate A clicks or taps "yes," then, in block 1305, Candidate B is recommended to Organization X and visa-versa.

Figure 14:
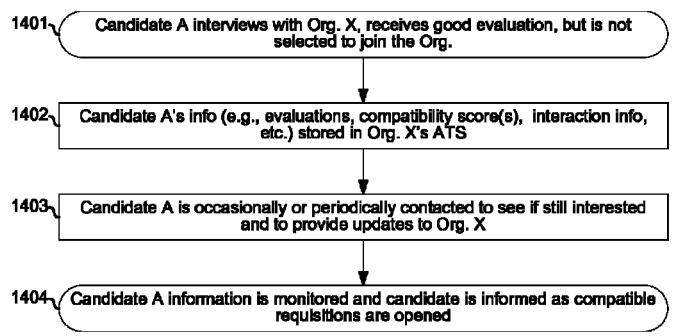
FIG. 14 depicts a flowchart illustrating an example process for candidate relationship management via an electronic recruiting management system.

FIG. 14 depicts a flowchart illustrating an example process for candidate relationship management via an electronic recruiting management system. In block 1401, Candidate A interviews for a position with Organization X, receives a favorable evaluation, but ultimately is not chosen for the position. In block 1402, Candidate A's information (e.g., résumé/CV, interviewer assessments, etc.) is stored in Organization X's applicant tracking system (ATS), which is integrated with the electronic recruiting system. In block 1403, the electronic system periodically and/or occasionally sends messages to (or prompts a recruiter to send messages to) Candidate A to keep Candidate A informed as to the activities of Organization X and/or to gauge whether Candidate A is still available and/or interested in a position with Organization X. For example, such messages may prompt Candidate A to reply if s/he is still available and/or interested. Upon receiving such a reply, the electronic recruiting system may automatically parse the reply and update Candidate A's status in the ATS. Additionally or alternatively, such messages may include questionnaires and/or fields via which Candidate A can update his/her information and such information can be automatically parsed and updated in the ATS upon receiving the reply. Such messages may be via the candidate's profile in the electronic recruiting system and/or via conventional email. Where the candidate has a profile in the electronic recruiting system, changes s/he makes to her/his profile may automatically be updated in Organization X's ATS. The updated information may be used to continually compare Candidate A against Organization X's open requisitions, as such requisitions are opened.

Figure 15:
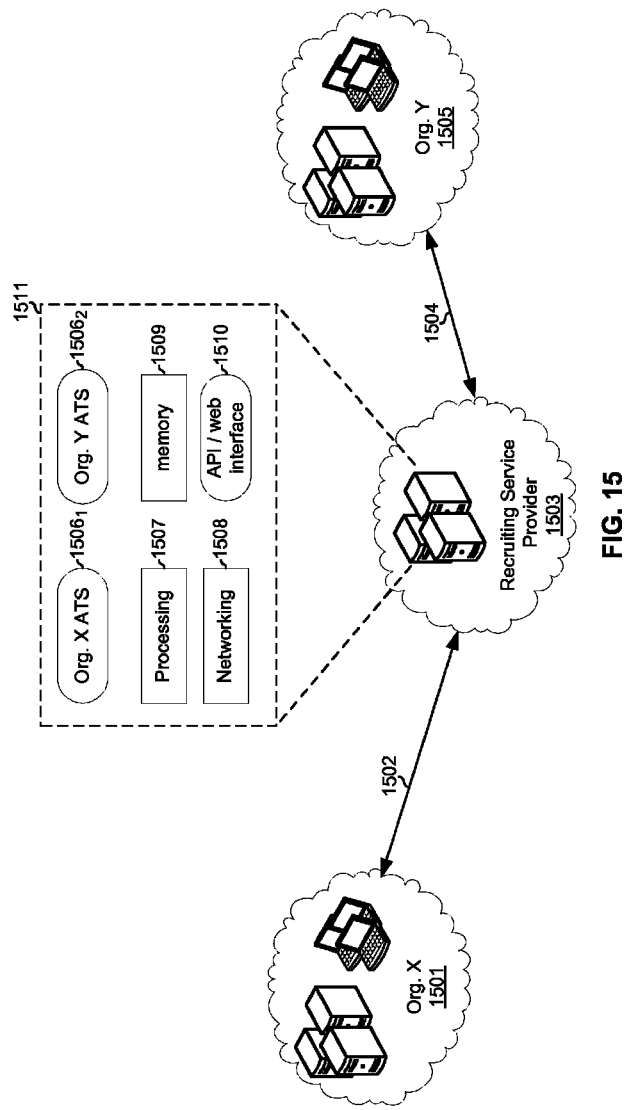
FIG. 15 depicts an example recruiting management system that houses applicant tracking systems for multiple organizations.

FIG. 15 depicts an example recruiting management system that houses applicant tracking systems for multiple organizations. Shown in FIG. 15 are Organization X's enterprise network 1501, Organization Y's enterprise network 1505, and a network 1503 of a recruiting service provider. Each of the networks 1501, 1503, and 1505 may comprise end-systems (e.g., servers, desktops, laptops, tablets, smartphones) and network "plumbing" (e.g., routers, switches, cabling, fiber, etc.). The network 1503 may comprise one or more servers 1511.

The server(s) 1511 may comprise: a processing circuit 1507 that may be similar to the processing circuit 120 described above with reference to FIG. 1; a networking circuit 1508 that may be similar to the networking circuit 118 described above with reference to FIG. 1, a memory 1509 circuit that may be similar to the memory circuit 122 described above with reference to FIG. 1; server application 1510 which may be similar to the server application 126 described above with reference to FIG. 1; and applicant tracking system (ATS) front-ends 1506, each of which may be similar to the database application 124 described above with reference to FIG. 1.

Each of the ATS front-ends may enable access to a particular organization's recruiting data. The data of different organizations (stored, for example, in memory 1509) may be kept securely separated to comply with privacy policies/regulations. Data may, however, be shared among organizations and/or shared with an organization-agnostic centralized repository (which may be in memory 1509) after having sensitive and/or private data stripped in compliance with applicable privacy policies/regulations.

Figure 16:
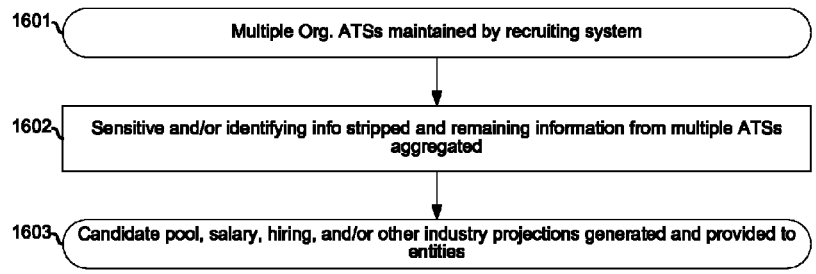
FIG. 16 depicts a flowchart illustrating an example process for projecting recruiting-related information using an electronic recruiting management system.

FIG. 16 depicts a flowchart illustrating an example process for projecting recruiting-related information using an electronic recruiting management system. The process begins with recruiting data of multiple organizations' ATSs being stored in the electronic recruiting system (e.g., in memory 1509). In block 1602, identifying, private, and/or other sensitive information about the candidates in the various organization's ATSs is removed and the resulting privacy-cleaned information is stored in the electronic recruiting system (forming an "aggregate" or "cross-organizational" ATS). The information stored in the aggregate ATS may be analyzed by the electronic recruiting system to determine various recruiting metrics. Examples of such metrics include: number of positions filled, number of positions projected to be filled in a future time frame, candidate pool sizes used for filling past positions, current candidate pool sizes, current salaries, and projected salaries for some future time frame. The various metrics calculated from the information in the aggregate ATS may be categorized such as by, for example, industry, geographic region, experience level, salary range, college major, and/or school. In block 1606, the information in the aggregate ATS and/or the metrics generate from such information may be used for generating recruiting-related projections or guidelines such as, for example: salaries that should be paid/offered to remain competitive, necessary candidate pool sizes for filling positions, which college majors to fund, which college majors to increase enrollment, etc.

Figure 17:
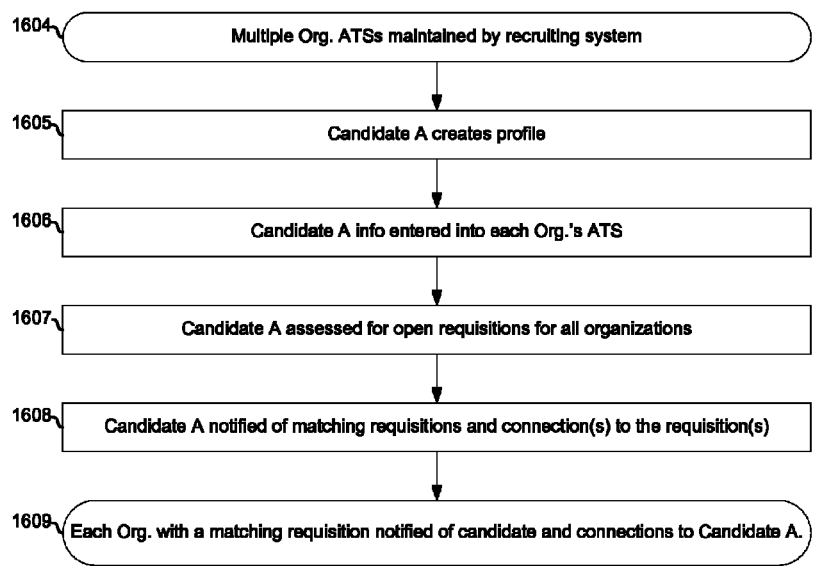
FIG. 17 depicts a flowchart illustrating an example process for matching candidates and requisitions over multiple organizations.

FIG. 17 depicts a flowchart illustrating an example process for matching candidates and requisitions over multiple entities. The process begins with block 1604 in which multiple organizations' ATSs are stored in the electronic recruiting system (e.g., in memory 1509). In block 1605, Candidate A creates a profile in the electronic recruiting system (e.g., by having his information scanned in at an event). In block 1606, the information from Candidate A's profile is copied to each organization's ATS. In block 1607, Candidate A is assessed for compatibility with multiple open requisitions across multiple ones of the organizations.

In block 1608, Candidate A is notified of requisitions for which he meets the requirements. Such a notification of block 1608 may additionally (or alternatively) comprise a score indicating Candidate A's compatibility with the associated organization.

For requisitions that are open for Candidate A to submit an application, Candidate A may be provided with an interface element via which s/he can apply for the requisitions, as, for example, described above with reference to FIG. 8E.

The notification may additionally (or alternatively) comprise information about how Candidate A may be connected to the associated organization in the electronic recruiting system. For example, Candidate A may be notified of a chain of one or more candidate and/or organization subscriptions and/or past interactions that ultimately lead to the associated organization and/or one of its recruiters. Candidate A may then attempt to seek recommendations for the requisition from one or more of the persons or organizations along that chain. Such information may be useful to Candidate A where one or more of the requisitions are "invite only" (e.g., only to candidates who have been recommended by someone sufficiently connected to the organization). For example, Candidate A may be notified that s/he meets the requirements for position Z with Organization X, that Candidate A is a good cultural fit for Organization X, that Candidate A recently interacted with Candidate B at a recruiting event and that Candidate B is subscribed to by Organization X. Accordingly, Candidate A may try to cultivate his/her relationship with Candidate B in an attempt to get Candidate B to recommend Candidate A to Organization X via the electronic recruiting system.

In block 1609, the organization(s) for which Candidate A was determined to meet the requirements for an open requisition in 1607 may be notified of Candidate A's fit for the position and may be notified of a chain of subscriptions and/or interactions that lead to Candidate A.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, interface elements the computing system such that it carries out the methods described herein.

The present method and/or system may also be embedded in a machine-readable, computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. The computer program product may be provided, for example, on optical and/or magnetic storage and/or may be downloadable via network such as the Internet.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
  a terminal configured to:
    display a list of recruiting events;
    in response to selection, on said terminal by a user of said terminal, of one of said recruiting events in said list of recruiting events, display a list of a plurality of candidates associated with said selected one of said recruiting events;
    select one of said candidates from said list of candidates based on a unique code read, by said terminal, from a computing device physically presented by said selected candidate;
    subsequent to said selection of said selected candidate:
      display a profile of said selected candidate; and
      display an interactive form via which a user of said terminal can input an assessment of said selected candidate;
    retrieve said profile of said selected candidate from a computer system that also stores a plurality of employer profiles corresponding to a plurality of employers and a plurality of job requisitions corresponding to a plurality of employers, wherein:
      said computer system is configured to analyze a current candidate pool for a particular one of said job requisitions to determine that said candidate pool is insufficient to ensure, with a desired probability, that said particular one of said job requisitions will be filled;
      in response to said determination, said computer system is configured to analyze said candidate pool and to analyze requirements of said particular one of said job requisitions to determine one or more changes that could be made to said requirements to increase said candidate pool to a size necessary to ensure, with said desired probability, that said particular one of said job requisitions will be filled; and
      present said one or more changes to a user of said computer system such that said user of said computer system can accept or reject said one or more changes.

2. The system of claim 1, wherein said terminal is configured to:
  display an interface element that provides real-time information indicating:
    which candidates are currently in attendance at said selected one of said recruiting events; and
    which of said candidates currently in attendance at said selected one of said recruiting events are currently on a waiting list to interview, at said selected one of said recruiting events, with an organization for which said user of said terminal is recruiting.

3. The system of claim 1, wherein said terminal is configured to:
  display a list of candidates whom said user of said terminal has previously personally interacted with, said list of interacted-with candidates being sortable by one or more of: candidate identifier, time of said previous personal interactions, and location of said previous personal interactions; and
  in response to selection, by said user of said terminal, of an interacted-with candidate in said list of interacted-with candidates, display a list of previous personal interactions between said user of said terminal and said selected interacted-with candidate, each one of said interactions in said list of previous personal interactions with said selected interacted-with candidate comprising one or more of: time of said one of said previous personal interactions, and location of said one of said previous personal interactions.

4. The system of claim 3, wherein said terminal is configured to:
  in response to selection of one of said interactions, display an interface for said user of said terminal to enter notes about said selected one of said interactions.

5. The system of claim 1, wherein said terminal is configured to display an interface element that enables selection of said interactive form from a plurality of interactive forms, wherein different ones of said plurality of interactive forms are customized for different recruiters scheduled to interview said selected candidate.

6. The system of claim 1, wherein said terminal is configured to automatically select said interactive form from a plurality of interactive forms based on a combination of said selected candidate's profile, a profile of said user of said terminal, and a profile of the organization for which said selected candidate is to be interviewed.

7. The system of claim 1, wherein:
  at least one interview question of said interactive form is selected from a question repository that stores a plurality of questions along with corresponding feedback;
  for any arbitrary one of said plurality of questions, said corresponding feedback comprises feedback from an interviewer based on said interviewer's previous use of said one of said plurality of questions.

8. The system of claim 1, wherein:
  said interactive form comprises a plurality of questions and a corresponding plurality of fields for said user of said terminal to input responses to said plurality of questions; and
  said terminal is configured to:
    during an assessment of said selected candidate, as responses from said selected candidate are input to said interactive form, automatically select follow-up questions and populate said follow-up questions on said interactive form, wherein said follow-up questions are based on a combination of: said responses from said selected candidate, said profile of said selected candidate, and a profile of said user of said terminal.

9. The system of claim 1, wherein:
at least one interview question of said interactive forms is selected from a question repository that stores a plurality of questions along with corresponding feedback;
for any arbitrary one of said plurality of questions, said corresponding feedback comprises information as to subsequent job performance of past interviewees who were hired based, at least in part, on their response to said one of said plurality of questions.

10. The system of claim 9, wherein:
in response to selection of said one of said candidates, display a list of previously-completed evaluations of said selected particular candidate; and
said terminal is configured to display aggregate, mean, and/or median score of said previously-completed evaluations.

11. The system of claim 1, wherein said selected candidate's profile comprises a cultural fit score that indicates compatibility between said selected candidate and workplace culture of an employer for which said user of said terminal is recruiting.

12. The system of claim 11, wherein said cultural fit score is generated based on responses to a workplace culture questionnaire provided by said selected candidate and responses to a workplace culture questionnaire provided by employees of said employer.

13. The system of claim 1, wherein said terminal is configured to:
during said selected one of said recruiting events, display a notification upon the following two conditions being true:
said selected candidate is within a determined proximity of a booth of said employer at said selected one of said recruiting events; and
a score that indicates compatibility between said selected candidate and an employer for which said user is recruiting is above a threshold; and
in response to said user of said terminal selecting a send invite interface element presented as part of said notification, transmitting an invite message to said selected candidate, said invite message inviting said candidate to interview, at said selected one of said recruiting events, with an organization for which said user of said terminal is recruiting.

14. The system of claim 13, wherein said terminal is configured to:
in response to receiving an acceptance message sent in reply to said invite message, adding said selected candidate to a waiting list of candidates to be interviewed, at said selected one of said recruiting events, for a position with an organization for which said user of said terminal is interviewing at said selected one of said recruiting events.

15. The system of claim 1, wherein said terminal is configured to:
during said selected one of said recruiting events, transmit a message to said selected candidate in response to an electronic notification generated in response to said selected candidate arriving at said selected one of said recruiting events and checking in to a check-in terminal which is communicatively coupled to said terminal.

16. The system of claim 1, wherein said computer system is configured to:
generate a plurality of scores, each of said scores indicating compatibility between one of said plurality of candidates and one of said plurality of employers; and
provide art interface via which:
said plurality of candidates are enabled to manage said plurality of candidate profiles and view said plurality of employer profiles;
said plurality of employers are enabled to manage said plurality of employer profiles and view said plurality of candidate profiles; and
said scores are provided to said plurality of candidates and said plurality of employers.

17. The system of claim 1, wherein computer system is configured to:
determine that a current candidate pool of a particular one of said plurality of employers is insufficient to meet hiring targets of said particular one of said plurality of employers;
in response to said determination, search said plurality of candidate profiles to identify possible candidates to add to said candidate pool; and
recommend said identified possible candidates to said one of said plurality of employers.

18. A method comprising:
performing by a recruiting terminal in use by a recruiter at a recruiting event:
displaying a list of recruiting events;
in response to said recruiter selecting a recruiting event in said list, downloading, from a server to local memory of said terminal, candidate profiles and associated resources corresponding to candidates that are registered for said recruiting event;
scanning a QR code displayed on a candidate's mobile device;
searching said candidate profiles for a candidate profile associated with said QR code; and
when a candidate profile associated with said QR code is found during said searching, displaying said one of said candidate profiles and displaying an interactive form via which said recruiter can input an assessment of said candidate; wherein
said server stores a plurality of candidate profiles, a plurality of employer profiles corresponding to a plurality of employers and a plurality of job requisitions corresponding to a plurality of employers;
said server is configured to analyze a current candidate pool for a particular one of said job requisitions to determine that said candidate pool is insufficient to ensure, with a desired probability, that said particular one of said job requisitions will be filled;
in response to said determination, said server is configured to analyze said candidate pool and to analyze requirements of said particular one of said job requisitions to determine one or more changes that could be made to said requirements to increase said candidate pool to a size necessary to ensure, with said desired probability, that said particular one of said job requisitions will be filled; and
said server is configured to present said one or more changes to a user of said server such that said user of said server can accept or reject said one or more changes.

19. The method of claim 18, comprising:
when a candidate profile associated with said QR code is not found during said searching, displaying an interface for inputting a candidate profile to be associated with said QR code.

20. A system comprising:
a computer system comprising at least one processor and an electronic memory that stores information about a plurality of candidates and a job requisition, said computer system configured to:
- analyze a current pool of candidates for said job requisition to determine that said pool of candidates is insufficient to ensure, with a desired probability, that said job requisition will be filled;
- analyze said pool of candidates and analyze requirements of said job requisition to determine one or more changes that could be made to said requirements to increase said pool of candidates to a size necessary to ensure, with said desired probability, that said job requisition will be filled; and
- present said one or more changes to a user associated with said job requisition for acceptance or rejection said one or more changes.

* * * * *